United States Patent
Ishibashi et al.

(10) Patent No.: US 11,969,662 B2
(45) Date of Patent: Apr. 30, 2024

(54) ROBOT DEVICE

(71) Applicant: SONY CORPORATION, Tokyo (JP)

(72) Inventors: Hidenori Ishibashi, Tokyo (JP); Tomoo Mizukami, Tokyo (JP); Takuma Araki, Tokyo (JP); Masato Muraki, Kanagawa (JP); Tomoyuki Arai, Tokyo (JP); Goushi Koike, Tokyo (JP); Takayuki Ito, Kanagawa (JP); Kouta Katsumura, Aichi (JP); Yohei Watanabe, Aichi (JP); Muneyuki Horiguchi, Kanagawa (JP); Takashi Maeda, Aichi (JP); Satoshi Muto, Chiba (JP); Hideo Miyano, Aichi (JP)

(73) Assignee: SONY CORPORATION, Tokyo (JP)

( * ) Notice: Subject to any disclaimer, the term of this patent is extended or adjusted under 35 U.S.C. 154(b) by 693 days.

(21) Appl. No.: 16/758,514

(22) PCT Filed: Sep. 6, 2018

(86) PCT No.: PCT/JP2018/033020
§ 371 (c)(1),
(2) Date: Apr. 23, 2020

(87) PCT Pub. No.: WO2019/087567
PCT Pub. Date: May 9, 2019

(65) Prior Publication Data
US 2020/0246982 A1 Aug. 6, 2020

(30) Foreign Application Priority Data
Oct. 31, 2017 (JP) ................................. 2017-210786

(51) Int. Cl.
*A63H 13/02* (2006.01)
*A63H 11/00* (2006.01)
(Continued)

(52) U.S. Cl.
CPC ........... *A63H 13/02* (2013.01); *A63H 13/005* (2013.01); *A63H 11/00* (2013.01); *A63H 29/22* (2013.01)

(58) Field of Classification Search
CPC ........ A63H 11/00; A63H 11/18; A63H 11/20; A63H 13/02; A63H 13/005; A63H 29/22; A63H 2011/16
(Continued)

(56) References Cited

U.S. PATENT DOCUMENTS 3,286,394 A * 11/1966 Brudney .................. A63H 3/38
446/389
4,705,488 A * 11/1987 Bohl, Jr. ................ A63H 3/445
446/393

(Continued)

FOREIGN PATENT DOCUMENTS

| CN | 201033434 Y | 3/2008 |
| CN | 103301635 A | 9/2013 |

(Continued)

OTHER PUBLICATIONS

Proceedings of the IEEE / RSJ International Conference on Intelligent Robots and Systems (IROS): "A bio-inspired postural control for a quadruped robot: An attractor-based dynamics" (Joao Sousa et al.)—Oct. 18-22, 2010 in Taipei, Taiwan published by IEEE in Piscataway, NJ, USA—Oct. 18, 2010 pp. 5329-5334, XP031810695, ISBN: 978-1-4244-667 4-0.

*Primary Examiner* — Joseph B Baldori
(74) *Attorney, Agent, or Firm* — Paratus Law Group, PLLC

(57) ABSTRACT

There is provided a robot device including: a head portion coupled to a trunk; four leg portions on a front left, a front right, a rear left, and a rear right coupled to the trunk; a first indirect portion that tilts the head portion left and right; and a second joint portion that rotates, with respect to the trunk, (Continued)

one of the leg portions on the rear left and the rear right to a front side, and the other to a rear side. It is possible to faithfully reproduce the movement of the four-legged animal by providing the first joint portion and the second joint portion.

22 Claims, 20 Drawing Sheets

(51) Int. Cl.
  *A63H 13/00* (2006.01)
  *A63H 29/22* (2006.01)
(58) Field of Classification Search
  USPC ....... 446/330, 338, 352, 353, 356, 358, 377, 446/381, 383
  See application file for complete search history.

(56) References Cited

U.S. PATENT DOCUMENTS

| | | | | |
|---|---|---|---|---|
| 5,000,714 | A * | 3/1991 | Su | A63H 3/38 446/485 |
| 6,462,498 | B1 * | 10/2002 | Filo | A63H 11/20 446/355 |
| 6,481,512 | B1 * | 11/2002 | Nagatsuka | B25J 9/102 180/8.1 |
| 6,995,542 | B2 * | 2/2006 | Yu | A63H 13/00 320/132 |
| 7,901,265 | B1 * | 3/2011 | Cameron | A63H 3/46 446/376 |
| 8,175,747 | B2 * | 5/2012 | Lee | A63H 11/00 74/490.03 |
| 9,636,602 | B1 * | 5/2017 | Samo | A63H 17/002 |
| 10,158,105 | B2 * | 12/2018 | Jenkins | H01M 50/209 |
| 2004/0193318 | A1 | 9/2004 | Ito | |
| 2006/0270312 | A1 * | 11/2006 | Maddocks | A63H 3/28 446/337 |
| 2013/0206488 | A1 * | 8/2013 | Horinouchi | B62D 57/032 901/1 |
| 2014/0065927 | A1 * | 3/2014 | Su | G01G 17/00 177/1 |
| 2018/0108884 | A1 * | 4/2018 | Chen | H01M 50/213 |
| 2018/0236367 | A1 * | 8/2018 | Bills | B60K 7/0007 |
| 2019/0181666 | A1 * | 6/2019 | Hayashi | B60L 53/36 |
| 2019/0221166 | A1 * | 7/2019 | Heilbron | G09G 3/32 |

FOREIGN PATENT DOCUMENTS

| | | |
|---|---|---|
| CN | 203750179 U | 8/2014 |
| CN | 109719738 A | 5/2019 |
| EP | 3705241 A1 | 9/2020 |
| JP | H11-77560 A | 3/1999 |
| JP | 2001-125641 A | 5/2001 |
| JP | 2002066155 A | 3/2002 |
| JP | 2002-323900 A | 11/2002 |
| JP | 2003-071144 A | 3/2003 |
| JP | 2003-071774 A | 3/2003 |
| JP | 2004-001148 A | 1/2004 |
| JP | 2004-066381 A | 3/2004 |
| JP | 2011-224752 A | 11/2011 |
| WO | WO 00/68880 A1 | 11/2000 |

* cited by examiner

ROBOT DEVICE

CROSS REFERENCE TO PRIOR APPLICATION

This application is a National Stage Patent Application of PCT International Patent Application No. PCT/JP2018/033020 (filed on Sep. 6, 2018) under 35 U.S.C. § 371, which claims priority to Japanese Patent Application No. 2017-210786 (filed on Oct. 31, 2017), which are all hereby incorporated by reference in their entirety.

TECHNICAL FIELD

The present disclosure relates to a robot device.

BACKGROUND ART

Conventionally, Patent Document 1 below describes a robot device that can perform not only four-legged walking but also two-legged standing.

CITATION LIST

Patent Document

Patent Document 1: Japanese Patent Application Laid-Open No. 2004-66381

SUMMARY OF THE INVENTION

Problems to be Solved by the Invention

However, the robot device described in the above Patent Document 1 has a problem in that the number of joints is limited and a movement of a four-legged animal such as a dog cannot be faithfully reproduced.

Therefore, it has been required to faithfully reproduce the movement of the four-legged animal.

Solutions to Problems

According to the present disclosure, there is provided a robot device including: a head portion coupled to a trunk; four leg portions on a front left, a front right, a rear left, and a rear right coupled to the trunk; a first indirect portion that tilts the head portion left and right; and a second joint portion that rotates, with respect to the trunk, one of the leg portions on the rear left and the rear right to a front side, and the other to a rear side.

Effects of the Invention

As described above, according to the present disclosure, it is possible to faithfully reproduce the movement of the four-legged animal.

Note that the above effect is not necessarily limited, and any one of effects shown in the present specification or other effects that can be grasped from the present specification may be achieved, together with or in place of the above effect.

MODE FOR CARRYING OUT THE INVENTION

Hereinafter, a preferred embodiment of the present disclosure will be described in detail with reference to the accompanying drawings. Note that, in the present specification and the drawings, duplicated description about components having substantially the same functional configuration is omitted by using the same reference signs.

Note that the description will be made in the following order.

Figure 1:
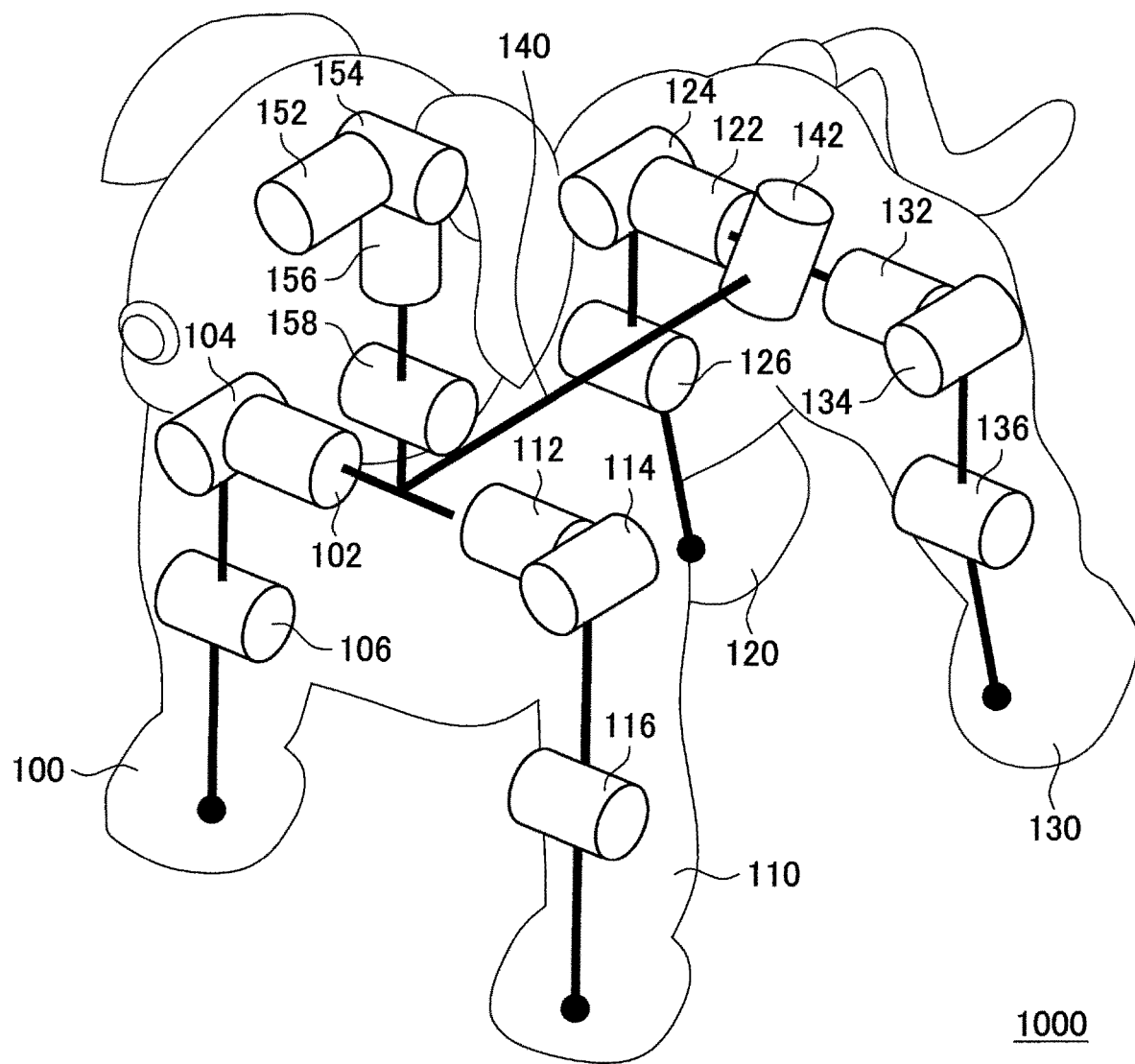
FIG. 1 is a schematic view illustrating an appearance of a robot device and rotating shafts of joints.

1. Configuration of Joint Portion
2. Mechanism for Moving Leg
3. Configuration of Ear
4. Configuration of Tail
5. Configuration and Arrangement Example of Sensor
6. Configuration of Eye 7. Configuration of Cover (Lid) of Housing Portion
8. Configuration of Battery
9. Configuration of Frame, Substrate, and Routing of Wiring
10. Configuration for Hiding Screw 1. Configuration of Joint Portion FIG. 1 is a schematic view illustrating an appearance of a robot device 1000 and rotating shafts of joints. The robot device 1000 includes four legs 100, 110, 120, and 130 that are driven by electric motors such as servomotors.

As illustrated in FIG. 1, the robot device 1000 includes a plurality of joint portions. Here, for convenience of description, the robot device 1000 is classified into, on the basis of movements thereof, a right front leg system, a left front leg system, a right rear leg system, a left rear leg system, a body system, and a head system. The right front leg system includes a joint portion 102, a joint portion 104, and a joint portion 106. The left front leg system includes a joint portion 112, a joint portion 114, and a joint portion 116. The right rear leg system includes a joint portion 122, a joint portion 124, and a joint portion 126. The left rear leg system includes a joint portion 132, a joint portion 134, and a joint portion 136. Furthermore, the body system includes a joint portion 142. The head system includes a joint portion 152, a joint portion 154, a joint portion 156, and a joint portion 158. Each of these systems is coupled to a trunk 140. Note that the joint portions illustrated in FIG. 1 indicate main joint portions driven with electric motors. In addition to the joint portions illustrated in FIG. 1, the robot device 1000 includes joint portions that move to follow movements of other joint portions. Furthermore, the robot device 1000 includes a plurality of movable portions such as a mouth, an ear, and a tail, and these movable portions are also driven by electric motors or the like.

In FIG. 1, each joint portion is illustrated as a cylinder. In each joint portion, a central axis of the cylinder corresponds to a rotating shaft of the joint portion.

In the present embodiment, the number of the joint portions is increased as compared with conventional robot devices. In the head system, since the joint portion 152 is provided, an operation of tilting a neck left and right in a case where the robot device 1000 is viewed from the front is achieved. Furthermore, in the body system, since the joint portion 142 is provided, a movement of swinging a waist left and right in a case where the robot device 1000 is viewed from above is achieved. With this arrangement, it is possible to achieve more various movements by the robot device 1000 than ever.

Each joint portion is driven by an electric motor such as a servomotor (hereinafter simply referred to as a motor). Note that a drive source is not particularly limited. A motor of each joint portion is housed in one box together with a gear mechanism and a microcontroller for driving the motor. The box includes a resin material (plastic or the like). It is possible to improve the quietness of the robot device 1000 by housing and sealing the motor and the gear mechanism in one box.

There are a box with two shafts and a box with one shaft as boxes for housing the motor, the gear mechanism, and the microcontroller. Taking the right rear leg system as an example, motors, gear mechanisms, and microcontrollers of the joint portion 132 and the joint portion 134 are housed in one box 200, and this box 200 constitutes two rotating shafts. On the other hand, a motor, a gear mechanism, and a microcontroller of the joint portion 136 are housed in one box 210, and this box 210 constitutes one rotating shaft.

In the present embodiment, a spherical joint can be achieved by housing two rotating shafts in one box 200 in particular. Furthermore, a space related to the joint portions can be reduced by housing two rotating shafts in one box, and the shape of the robot device 1000 can be determined with emphasis on the design.

Each system such as the right front leg system described above is controlled by a microcomputer included in each joint portion. Among the indirect portions, for example, the indirect portion 158 of the head system is configured to be electrically braked. If the indirect portion 158 can freely rotate when the power is turned off, for example, a head portion may fall down and hit a user's hand or the like. Such a situation can be avoided by braking the indirect portion 158. Braking can be achieved by a method of determining a rotation of a motor of the joint portion 158 on the basis of an electromotive force generated by the rotation of the motor when the power is turned off, and generating a driving force in a direction opposite to a direction in which the motor is to rotate.

2. Mechanism for Moving Leg

Figure 2:
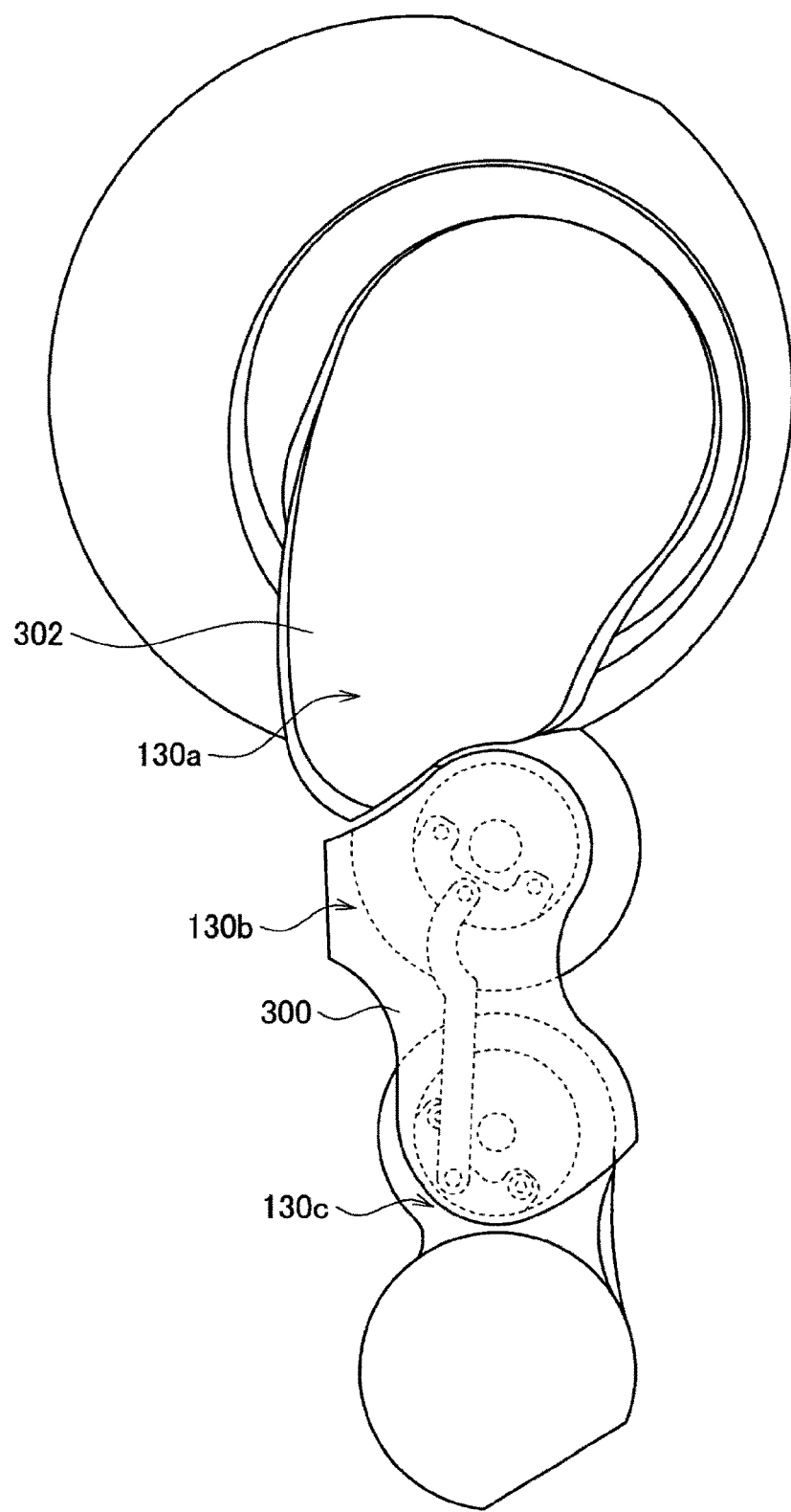
FIG. 2 is a schematic view illustrating a left rear leg viewed from a left side of the robot device.

Next, taking the left rear leg system as an example, a mechanism for moving a leg under a knee will be described in detail. Note that configurations of the other legs are similar to a configuration of the left rear leg system. FIG. 2 is a schematic view illustrating the left rear leg 130 viewed from a left side of the robot device 1000. The left rear leg 130 includes an arm 130a, an arm 130b, and an arm tip portion 130c. The arm 130a is provided with both the box 200 having two rotating shafts and the box 210 having one rotating shaft.

Figure 3:
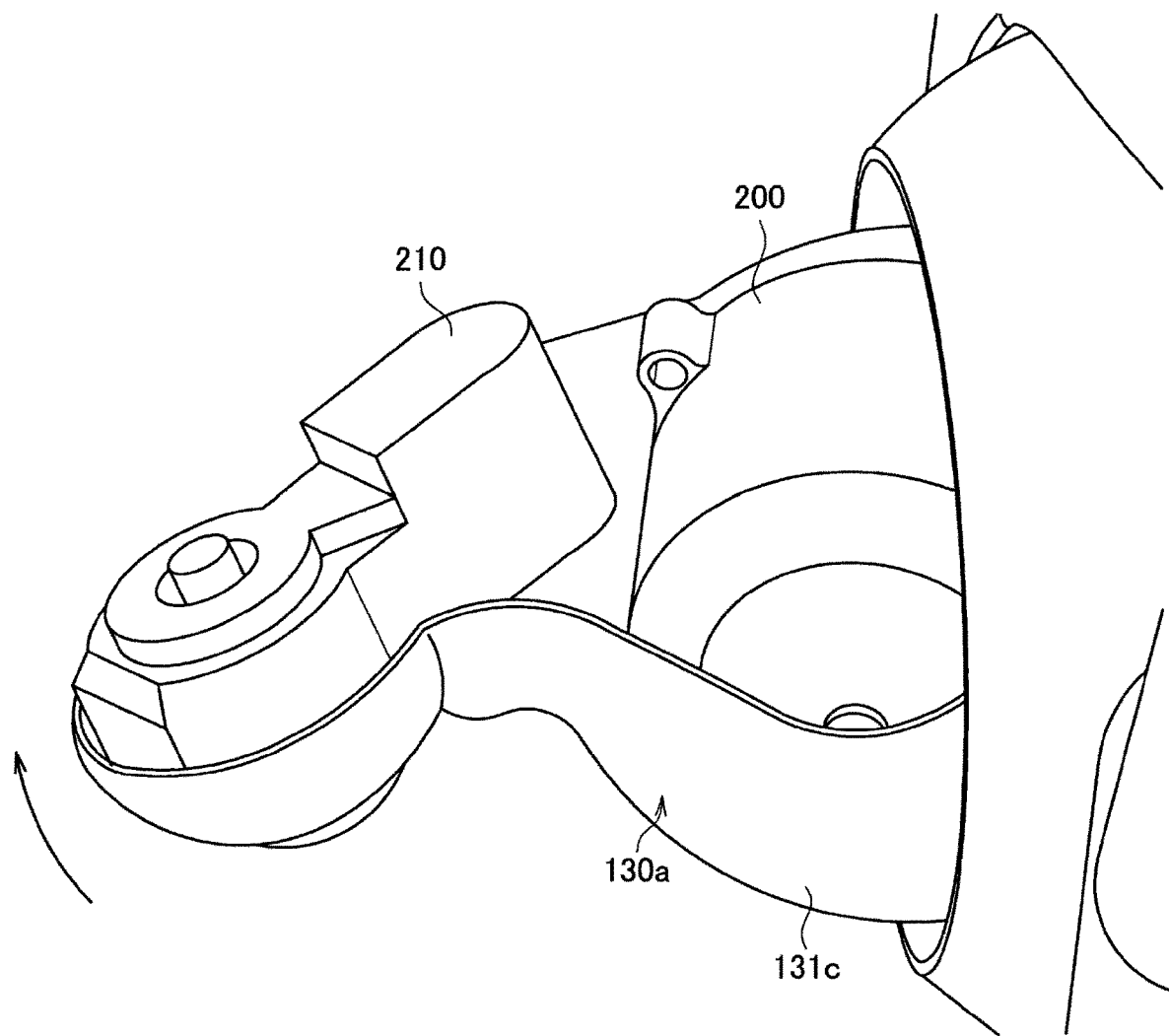
FIG. 3 is a schematic view illustrating a state in which a cover covering an arm illustrated in FIG. 2 is detached.

FIG. 3 illustrates a state in which a cover 302 covering the arm 130a illustrated in FIG. 2 is detached, and illustrates a state in which the arm 130a of the left leg is rotated in a direction of an arrow in FIG. 3. Note that, in FIG. 3, the arm 130b and the arm tip portion 130c are not illustrated. As illustrated in FIG. 3, the box 200 having two rotating shafts and the box 210 having one rotating shaft are provided in the arm 130a. The box 200 includes the rotating shaft 132 and the rotating shaft 134, and the box 210 includes the rotating shaft 136. All of the boxes 200 and 210 provided with motors and the like for driving the left rear leg 130 are collectively arranged in one arm 130a, so that a space of the other arm 130b can be used for another function. Therefore, the space can be used effectively. Furthermore, an exterior of a coupling portion 131c can be configured as a sphere by arranging the box 200 having two rotating shafts in a coupling portion 131a of the arm 130a to the trunk 140.

Figure 4:
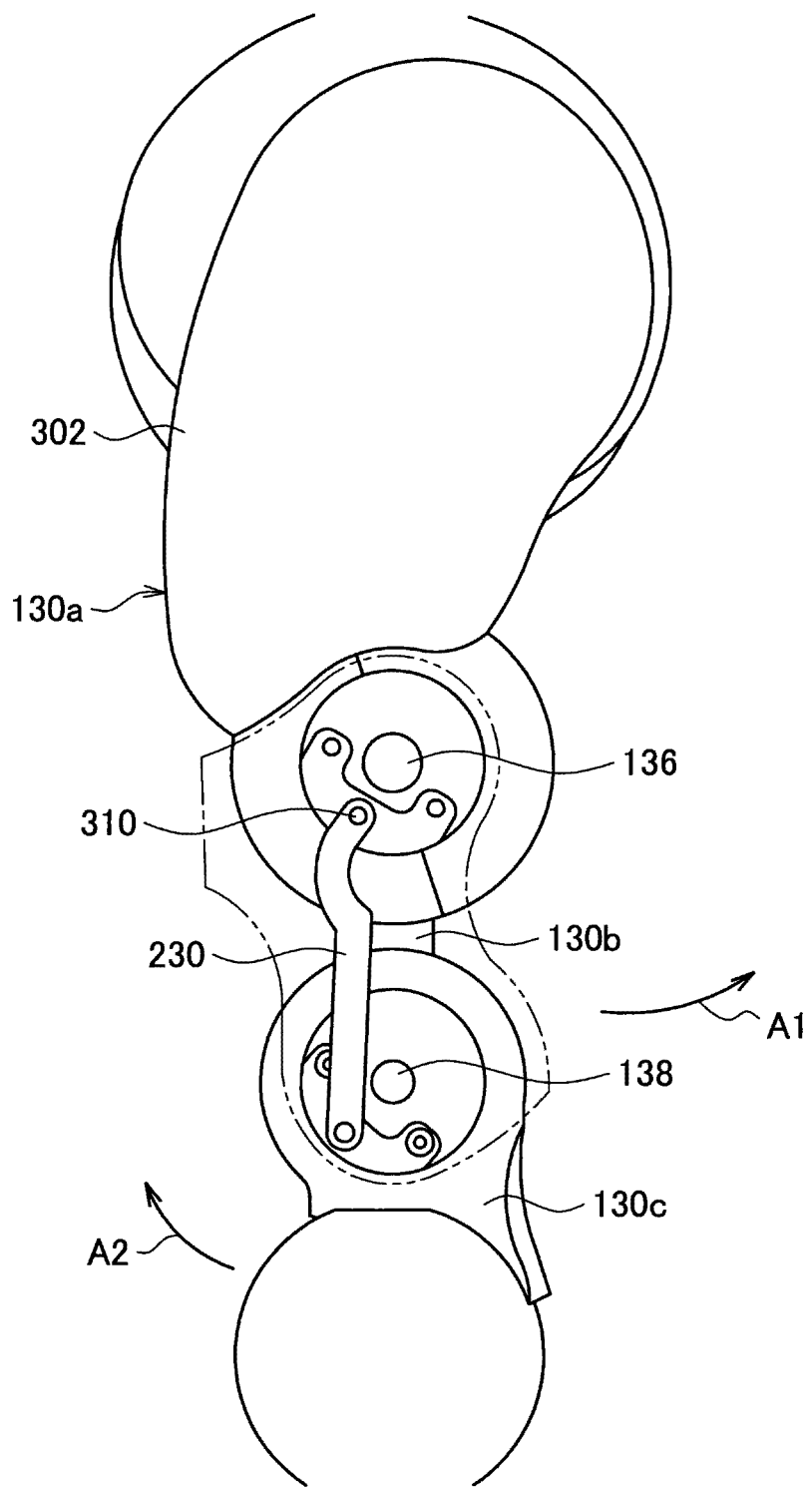
FIG. 4 is a schematic view illustrating a mechanism for driving an arm tip portion.

Furthermore, FIG. 4 is a schematic view illustrating a mechanism for driving the arm tip portion 130c, and illustrates a state in which a cover 300 provided on the arm 130b is detached from the state illustrated in FIG. 2. The arm tip portion 130c rotates with respect to the arm 130b, but no motor is provided on a rotating shaft 138 of the arm tip portion 130c. On the other hand, as illustrated in FIG. 4, the rotating shaft 136 around which the arm 130a and the arm 130b rotate relatively and the rotating shaft 138 around which the arm 130b and the arm tip portion 130c rotate relatively are coupled via a link 230. For this reason, the arm tip portion 130c rotates with a rotation of the arm 130b with respect to the arm 130a.

Specifically, in a case where the arm 130b rotates with respect to the arm 130a by a driving force of the motor provided in the box 210 of the rotating shaft 136, a position of a shaft 310 on an upper side of the link 230 does not move with respect to the arm 130a. For this reason, when the arm 130b rotates in a direction of an arrow A1 with respect to the arm 130a, for example, an arm tip portion 120c rotates in a direction of an arrow A2 with respect to an arm 120b. With this arrangement, when the arm 120b rotates in the direction of the arrow A1 with respect to an arm 120a and an operation of bending a knee of the right rear leg is performed, the arm tip portion 120c corresponding to an ankle rotates in the direction of the arrow A2. In this way, a movement of the ankle when bending the knee and crouching is achieved.

In addition, with such a mechanism, when walking with the left rear leg up, for example, the arm tip portion 130c rotates in the direction of the arrow A2, and a tip of the arm tip portion 130c is lifted, which restrains the tip of the left leg from being caught on the ground. With this arrangement, an amount of lifting the leg during walking can be reduced, and smooth and fast walking thus can be achieved.

Figure 5:
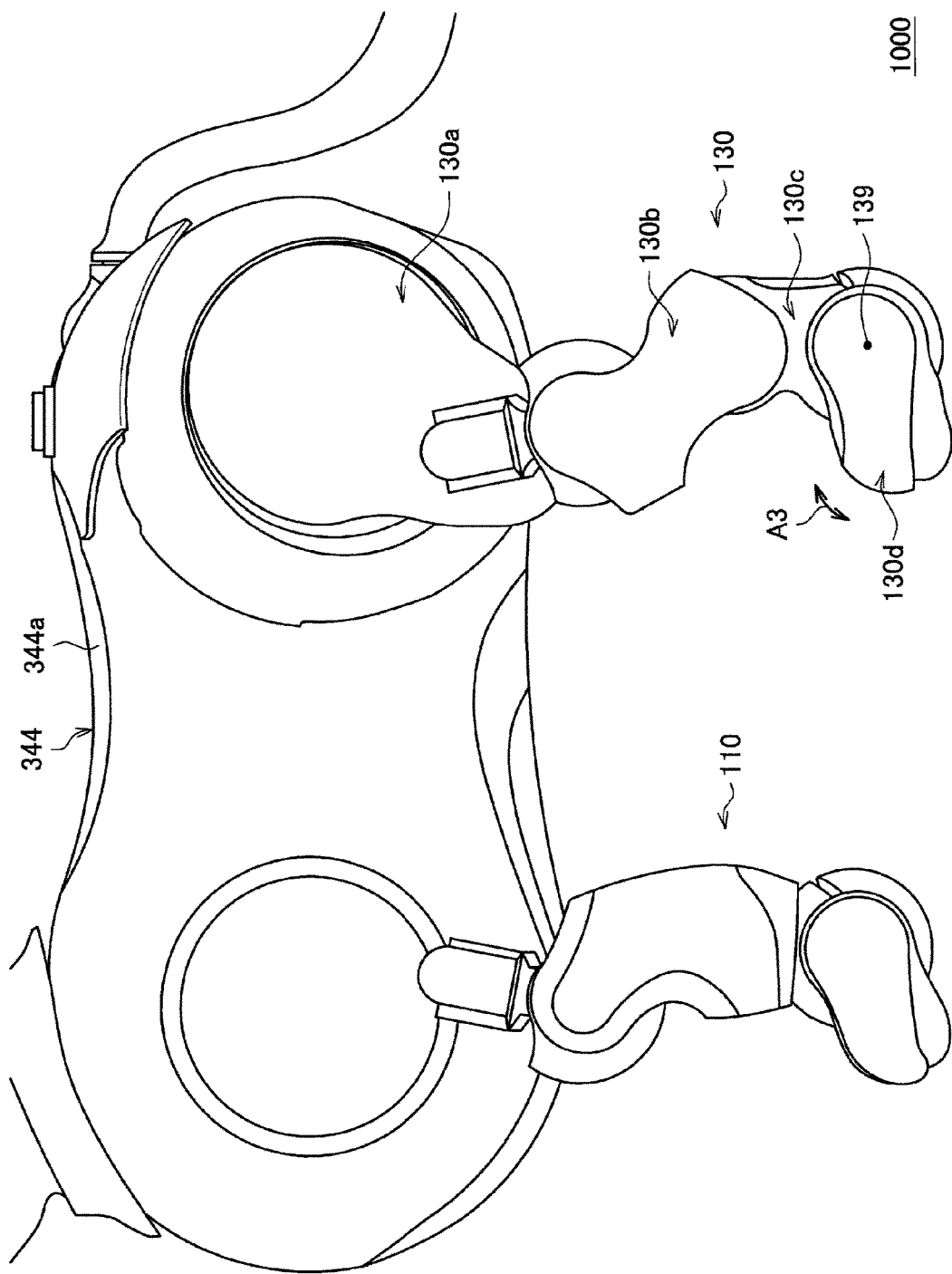
FIG. 5 is a schematic view illustrating the left side of the robot device.

FIG. 5 is a schematic view illustrating the left side of the robot device 1000. As illustrated in FIG. 5, a paw 130d is attached to the arm tip portion 130c. The paw 130d can freely rotate in directions of an arrow A3 around a rotating shaft 139 with respect to the arm tip portion 130c. The paw 130d is urged counterclockwise in FIG. 5 to a position of a predetermined stopper by a spring not illustrated. With this arrangement, when the robot device 1000 walks, the paw 130d can accurately hold a surface of a road (floor).

Figure 6A:
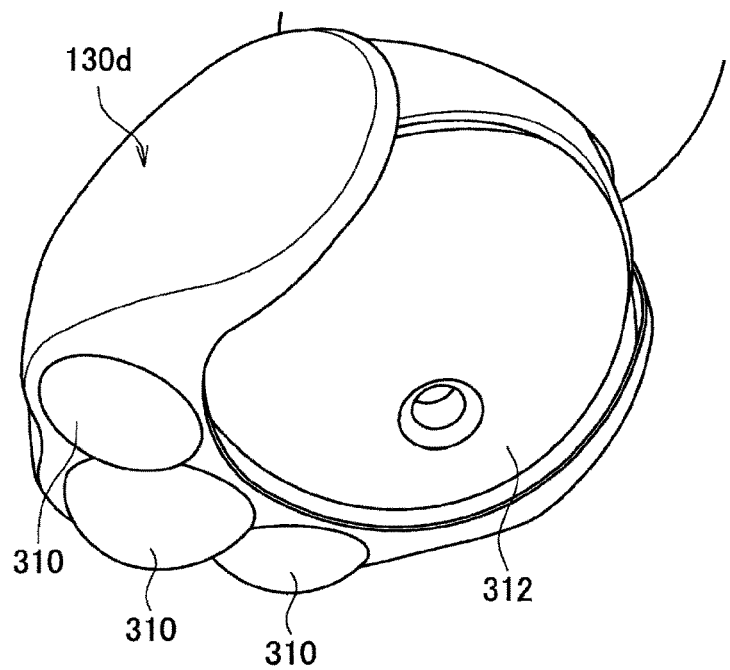
FIG. 6A is a schematic view illustrating a sole of a paw viewed from below.
Figure 6B:
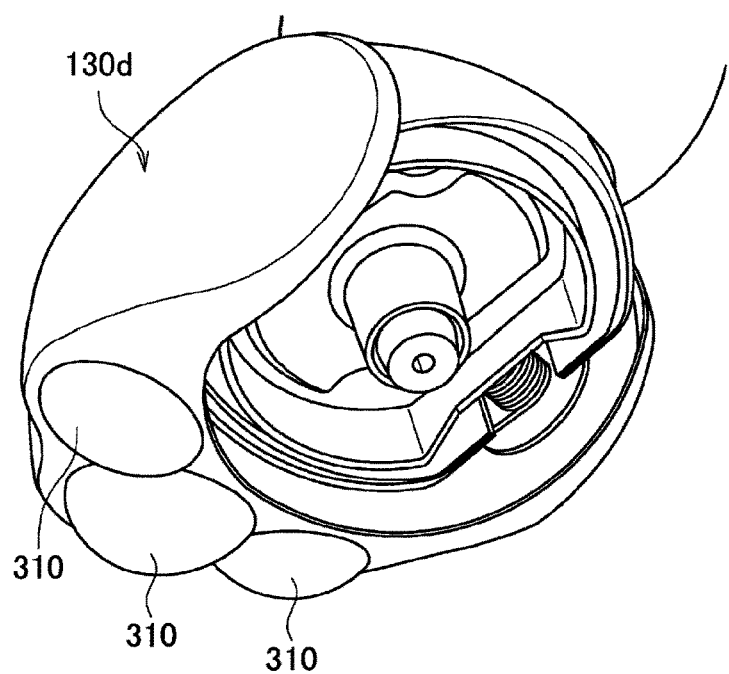
FIG. 6B illustrates a state in which pads are detached from the state of FIG. 6A.

FIG. 6A is a schematic view illustrating a sole of the paw 130d viewed from below. Pads 310 and a pad 312 are provided on the sole of the paw 130d. The pads 310 and the pad 312 both include a rubber material and have a built-in load sensor. The pad 312 can be detached and replaced. FIG. 6B illustrates a state in which the pad 312 is detached from the state of FIG. 6A. In a case where the pad 312 is worn, a user can detach the pad 312 and replace the pad 312 with a new one.

Furthermore, the pads 310 and the pad 312 can include materials different from each other, or the pad 312 can exhibit different functions, by replacing the pad 312. With this arrangement, for example, the pad 312 having an optimum function in accordance with a material of the floor or the like can be attached. Furthermore, it is possible to change a color of the pad 312 to a user's favorite color by replacing the pad 312 with one having a different color.

Figure 6C:
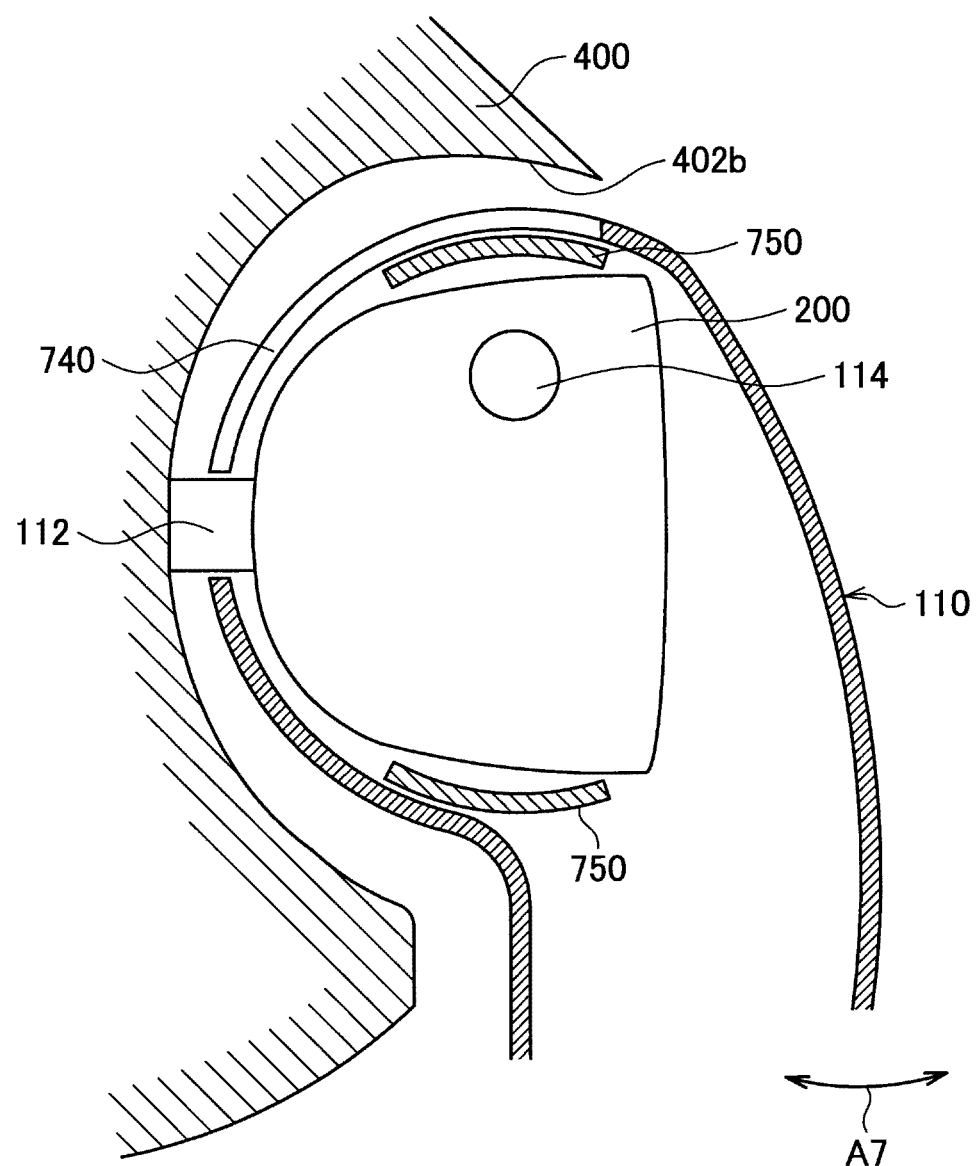
FIG. 6C is a schematic view illustrating a periphery of a base of a left front leg.

FIG. 6C is a schematic view illustrating a periphery of a base of the left front leg 110, and illustrates a cross section viewed from a front side of a robot device 500. As illustrated in FIG. 6C, the rotating shaft 112 and the rotating shaft 114 at the base of the left front leg 110 are housed in the box 200 with two shafts. The box 200 is housed in the left leg 110 with the rotating shaft 114 fixed to the left leg 110. Furthermore, by fixing the rotating shaft 112 to the trunk 140 (frame 400 described later), a box 2000 is fixed to the frame 400.

A portion of the left leg 110 that faces the frame 400 has a spherical shape as described above, and faces a recessed region 402a of a frame 402 described later. With such a configuration, the left leg 110 can be freely rotated with respect to the frame 400 by driving the rotating shaft 112 and the rotating shaft 114. Note that the other legs are configured similarly to in FIG. 6C.

As illustrated in FIG. 6C, when the rotating shaft 114 is driven, the leg 110 is driven in directions of an arrow A7. In order to avoid interference with the rotating shaft 112 at this time, grooves 740 corresponding to the rotating shaft 112 are provided on an exterior of the leg 110. By providing the grooves 740, the leg 110 can be rotated in the directions of the arrow A7 by driving the rotating shaft 114.

On the other hand, when the leg 110 rotates 90° or more, for example, in one of the directions of the arrow A7 from the state illustrated in FIG. 6C, the grooves 740 may rotate to positions not facing the frame 400, and one of the grooves 740 may be exposed to the appearance. In this case, foreign matter may be caught in the groove 740. For this reason, spherical covers 750 as illustrated in FIG. 6C are provided. Each of the covers 750 is a sphere in accordance with the shape of the adjacent leg 110. With such a configuration, in a case where the leg 110 freely rotates by driving the rotating shaft 114, which is one of two rotating shafts, it is possible to avoid exposing the groove 740 for avoiding interference of the other rotating shaft 112 to the outside. Note that the covers 750 may move in accordance with a movement of the leg 110. Furthermore, springs that urge the covers 750 in predetermined directions may be provided so that the covers 750 may abut on predetermined stoppers.

3. Configuration of Ear

Figure 7:
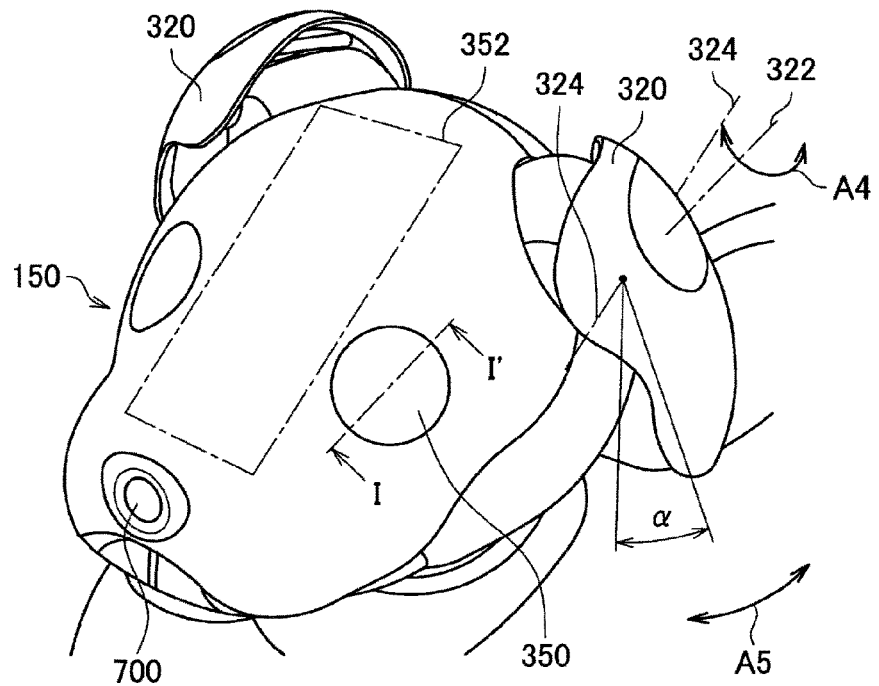
FIG. 7 is a schematic view illustrating a head portion of the robot device.

FIG. 7 is a schematic view illustrating a head portion 150 of the robot device 1000, in particular a face. The robot device 1000 is provided with ears 320. The ear 320 rotates in directions of an arrow A4 around a rotating shaft 322 by a driving force of a motor. Furthermore, the ear 320 of the robot device 1000 not only rotates in the directions of the arrow A4, but also is driven in directions in which a tip of the ear 320 opens left and right when viewed from the front (directions of an arrow A5), around a rotating shaft 324. In FIG. 7, an angle α at which the ear 320 opens in the directions of the arrow A5 is referred to as an opening angle.

Figure 8A:
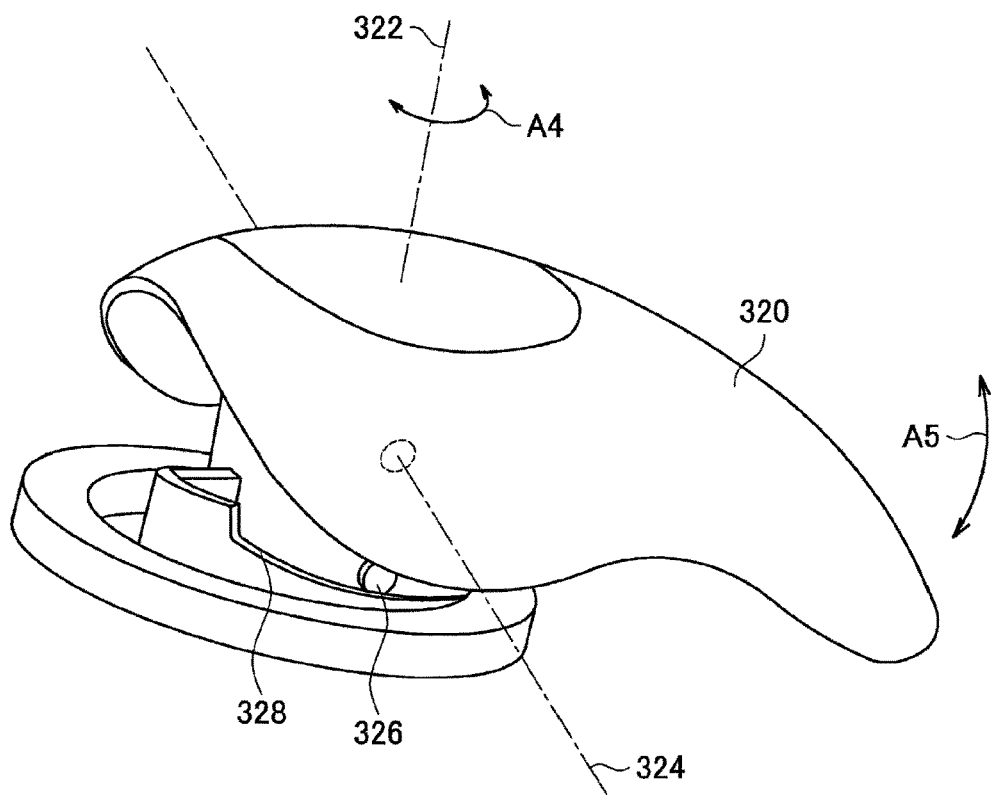
FIG. 8A is a schematic view illustrating an ear 320 and its periphery in detail.

FIG. 8A is a schematic view illustrating the ear 320 and its periphery in detail. The ear 320 rotates in the directions of the arrow A4 around the rotating shaft 322 by driving the built-in motor. As illustrated in FIG. 8A, the ear 320 is rotatable with respect to the rotating shaft 324. Furthermore, an oblique cam 328 fixed to the head portion 150 is provided on a base of the ear 320. When the ear 320 rotates in the directions of the arrow A4 around the rotating shaft 322, a cam follower 326 provided on the ear 320 slides on the oblique cam 328. With this arrangement, the ear 320 rotates in the directions of the arrow A5 around the rotating shaft 324.

Figure 8B:
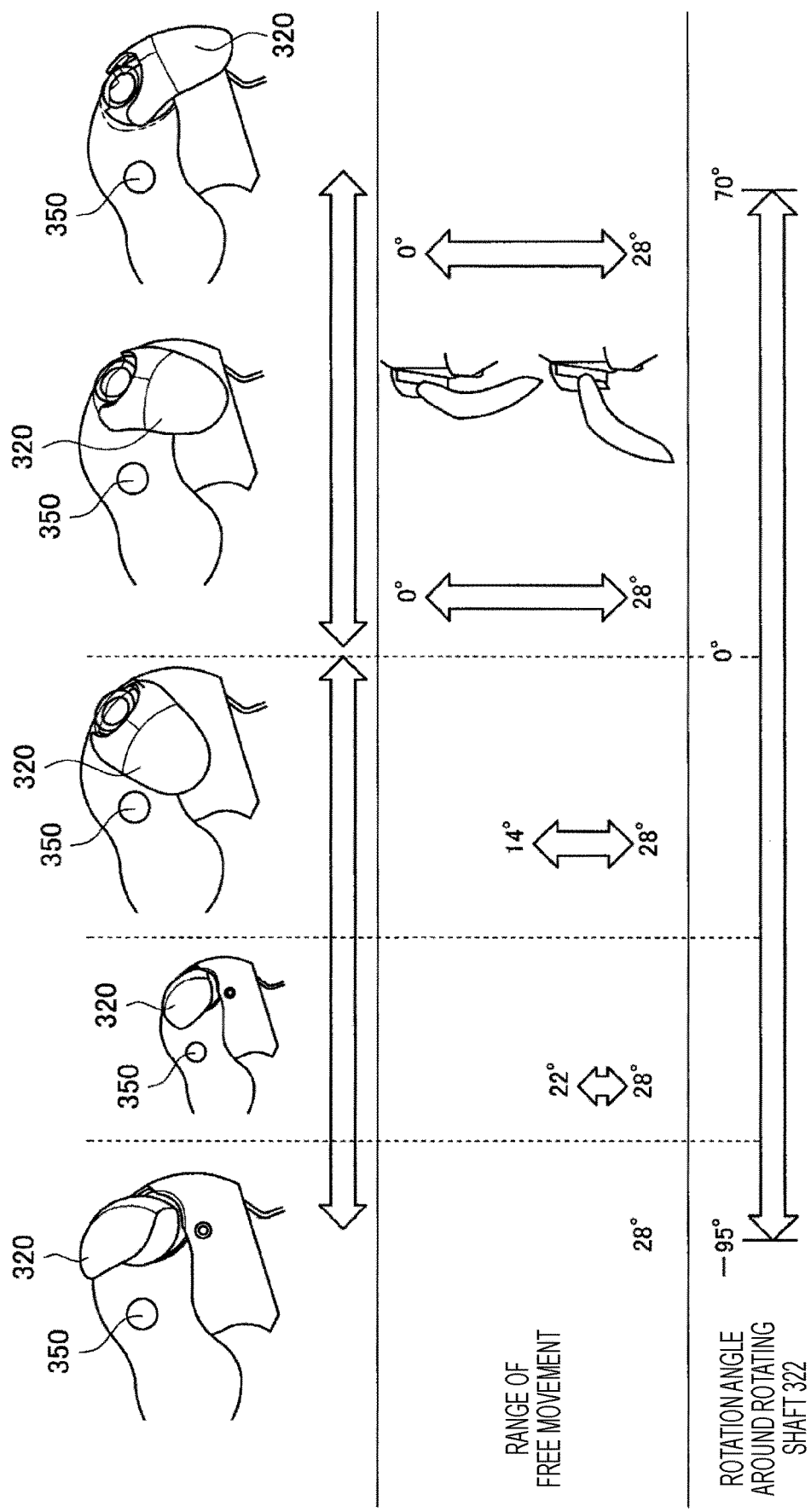
FIG. 8B is a schematic view for describing a movement of the ear 320.

FIG. 8B is a schematic view for describing a movement of the ear 320. The opening angle α of the ear 320 increases as the tip of the ear 320 rotates forward of the robot device 1000 when the ear 320 rotates around the rotating shaft 322. As an example, if the opening angle α of the ear 320 in a state where the opening of the ear 320 to the left and right is closed most is 0 degrees, the ear 320 can open up to 28 degrees at the maximum. As illustrated in FIG. 8B, when a rotation angle of the ear 320 around the rotating shaft 322 is in a range of 0° to 70°, the opening angle of the ear 320 is basically zero. On the other hand, even if the rotation angle of the ear 320 around the rotating shaft 322 is in the range of 0° to 70°, the ear 320 can freely open within a range of free movement, in which the opening angle α is 0 to 28 degrees, when a user touches the ear 320 and moves the ear 320 in a direction of opening the tip of the ear 320, because the cam follower 326 is mounted on the oblique cam 328. In other words, in a case where the rotation angle of the ear 320 around the rotating shaft 322 is 0° to 70°, the cam follower 326 is separated from the oblique cam 328, so that the ear 320 can rotate in the directions of the arrow A5 within the range of free movement around the rotating shaft 324.

In the case where the ear 320 rotates around the rotating shaft 324, when the opening angle α reaches 28 degrees, the ear 320 hits a predetermined mechanical stopper and cannot open any more. When the rotation angle of the ear 320 around the rotating shaft 322 is in the range of 0° to 70°, the range of free movement is a range from a state where the cam follower 326 abuts on the oblique cam 328 to a point where the cam follower 326 is separated from the oblique cam 328 and the ear 320 abuts on the above-described mechanical stopper.

On the other hand, as illustrated in FIG. 8B, when the rotation angle around the rotating shaft 322 is in a range of 0 to −95 degrees, as the rotation angle decreases, the cam follower 326 moves upward along the oblique cam 326, and the opening angle α of the ear 320 becomes larger. For this reason, the range of free movement in a direction in which the ear 320 opens is reduced. Furthermore, when the rotation angle around the rotating shaft 322 is −95 degrees, the opening angle of the ear 320 is 28 degrees and the range of free movement is 0.

As described above, by changing the opening angle α of the ear 320 in accordance with the rotation angle around the rotating shaft 322 of the ear 320, the movement of the ear 320 can be made more realistic, and emotional expressions of the robot device 1000 can be further enriched. Furthermore, even in a case where the ear 320 is not open, the ear 320 can open when a user touches the ear 320, by providing the range of free movement in the direction in which the ear 320 opens, and the movement of the ear 320 can be made more realistic.

4. Configuration of Tail

Figure 9A:
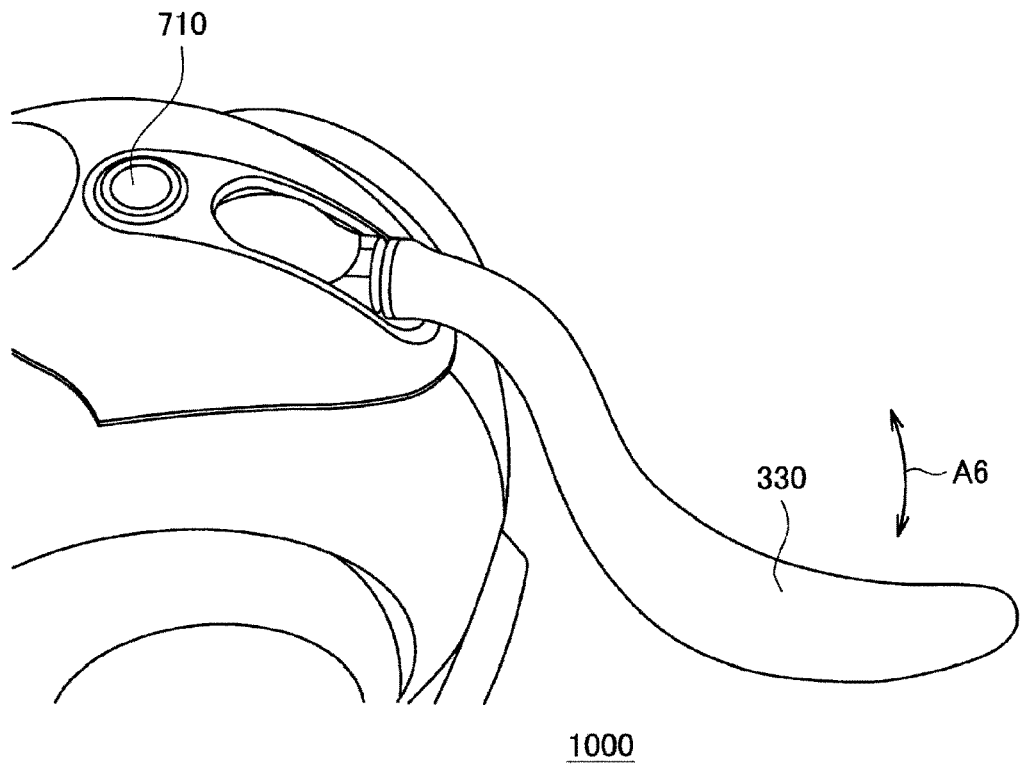
FIG. 9A is a schematic view illustrating an appearance of a tail provided to the robot device.
Figure 9B:
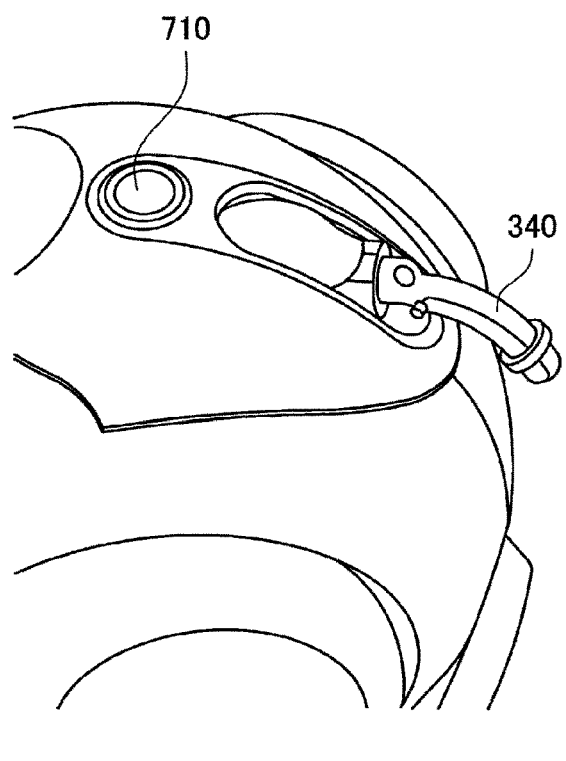
FIG. 9B is a schematic view illustrating a state in which the tail is detached from the state of FIG. 9A.

FIG. 9A is a schematic view illustrating an appearance of a tail 330 provided to the robot device 1000. In addition, FIG. 9B is a schematic view illustrating a state in which the tail 330 is detached from the state of FIG. 9A. The tail 330 is attached to a tail attachment portion 340. The tail attachment portion 340 rotates in directions of an arrow A6 by driving a motor. The tail 330 includes silicone rubber, and a tip side is thicker than a base. At the base of the tail 330, a hole into which the tail attachment portion 340 is inserted is provided. The tail 330 is solid in a region where the hole into which the tail attachment portion 340 is inserted is not formed. In this way, the tail 330 includes silicone rubber, the tip side is thicker than the base, and the tail 330 is solid, so that the tip side is heavy. For this reason, when the tail attachment portion 340 is driven in the directions of the arrow A6, the tail 330 vibrates appropriately. In addition, also when the robot device 1000 walks, the tail 330 vibrates appropriately. A user can have a sense of familiarity and attachment to the robot device 1000 by the appropriate vibration of the tail 330.

5. Configuration and Arrangement Example of Sensor

The robot device 1000 includes various sensors. On a back 344 of the robot device 1000 illustrated in FIG. 5, a pressure-sensitive sensor and an electrostatic sensor are provided over a wide range. As the pressure-sensitive sensor, a sensor capable of detecting a load of several tens to several thousand grams is arranged. By providing both the electrostatic sensor and the pressure-sensitive sensor on the back 344, it is possible to reliably detect an operation of a user in a case where the user strokes or strikes the back 344.

In particular, it is possible to prevent occurrence of erroneous detection by using the electrostatic sensor and the pressure-sensitive sensor in combination. For example, in a case where the robot device 1000 is walking, the pressure-sensitive sensor may erroneously detect a hand of a user by detecting a vibration. In such a case, if the hand is not detected by the electrostatic sensor, a reaction of the pressure-sensitive sensor can be ignored. In a case where the robot device 1000 is stationary, the possibility of erroneous detection by the pressure-sensitive sensor is low. Therefore, a hand of a user may be detected only on the basis of a detection by the pressure-sensitive sensor without using the electrostatic sensor.

Both the pressure-sensitive sensor and the electrostatic sensor arranged on the back of the robot device 1000 are built inside a cover 344*a* of the back 344. A coating including silicone rubber is provided on a surface of the cover 344*a* arranged outside the pressure-sensitive sensor and the electrostatic sensor. This coating is provided with a fine mesh pattern. With such a configuration, in a case where a user touches the back, a "smooth feeling" can be given, and a tactile sensation can be improved. As a result, in an interaction between a user and the robot device 1000, the tactile sensation that makes the user want to touch the robot device 1000 more can be given, and emotions of the user can be better conveyed.

Figure 17:
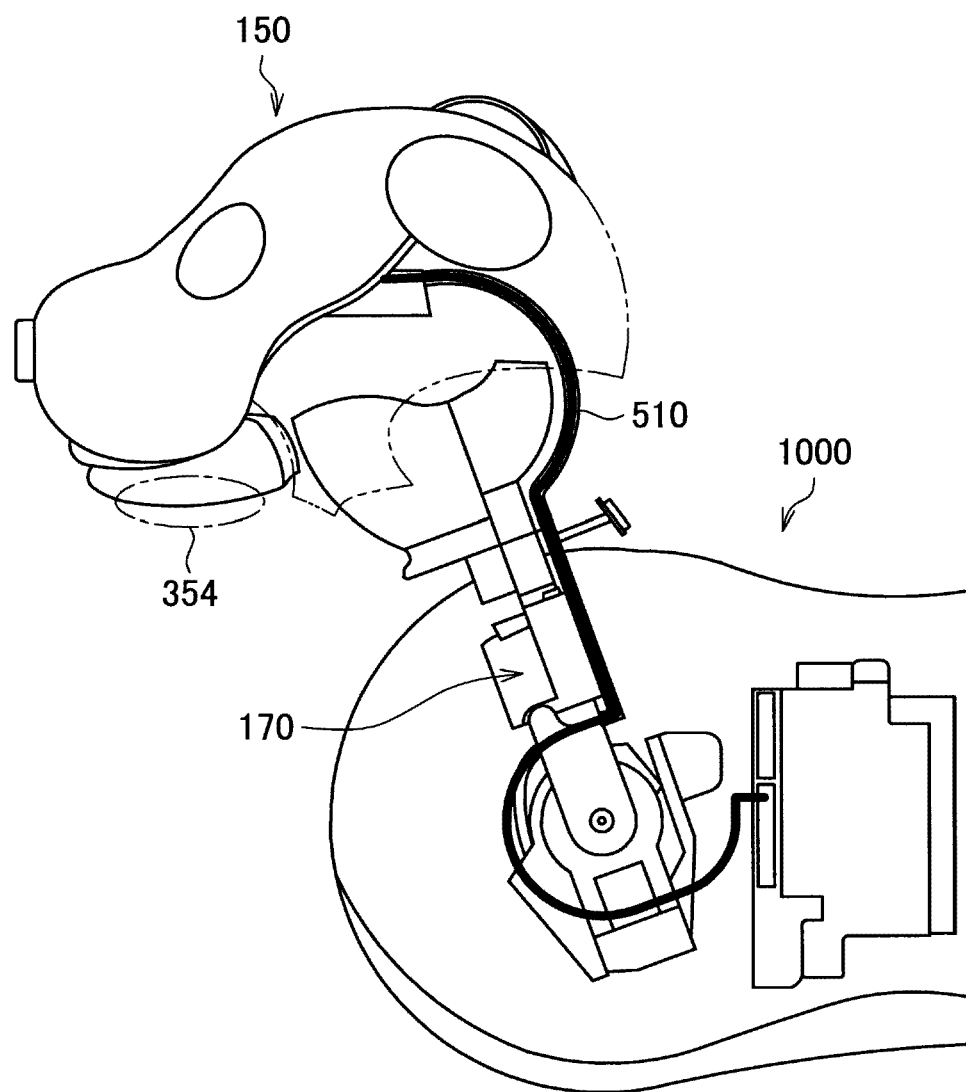
FIG. 17 is a schematic view illustrating a routing of a circuit substrate from a trunk to the head portion of the robot device.

The electrostatic sensor is built in a region 352 enclosed with a one-dot chain line from a top of the head to a nose in FIG. 7. Furthermore, as illustrated in FIG. 17, the electrostatic sensor is also built in a region 354 enclosed by a one-dot chain line of a jaw.

Therefore, also in a case where a user strokes the region 352 extending from the top of the head to the nose or the region 354 of the jaw, an operation of the user can be reliably detected.

When the robot device 1000 is stroked by a user, the robot device 1000 can recognize the operation as a reward. With this arrangement, the robot device 1000 can more frequently perform the operation performed immediately before being stroked.

As illustrated in FIG. 7, a camera 700 is attached to the nose of the robot device 1000. Furthermore, as illustrated in FIGS. 9A and 9B, a camera 710 is also attached to the back of the robot device 1000, in front of the tail 330. The robot device 1000 can recognize surrounding people and objects by imaging a periphery of the robot device 1000 with the cameras 700 and 710.

Furthermore, a human sensor and a position sensitive detector (PSD) are provided around the nose of the robot device 1000. For example, the human sensor can detect the temperature of a person up to 5 meters away. The robot device 1000 can detect a user with these sensors. Furthermore, the robot device 1000 also includes an illuminance sensor that detects illuminance.

Furthermore, the robot device 1000 includes gyro sensors (acceleration sensors) on the trunk and the head. With this arrangement, the robot device 1000 can detect its own posture. Furthermore, with the gyro sensors, the robot device 1000 can also detect a fall of itself or detect that it is being held up in user's arms.

Microphones are embedded at five positions in the head portion of the robot device 1000, and holes are provided on an exterior of the head portion corresponding to the positions of the microphones. Specifically, the microphones are built in two positions on the left and right, and the remaining microphones are built in a back of the head. Generally, it is possible to estimate a position of a sound source by acquiring sound from three microphones.

For example, when a voice is heard from a right side of the robot device 1000, the joint portion 152, the joint portion 154, the joint portion 156, and the joint portion 158 of the head system are controlled so that the head portion of the robot device 1000 faces right. By embedding the microphones in the head portion, natural movements of the head portion can be achieved.

6. Configuration of Eye

Figure 10:
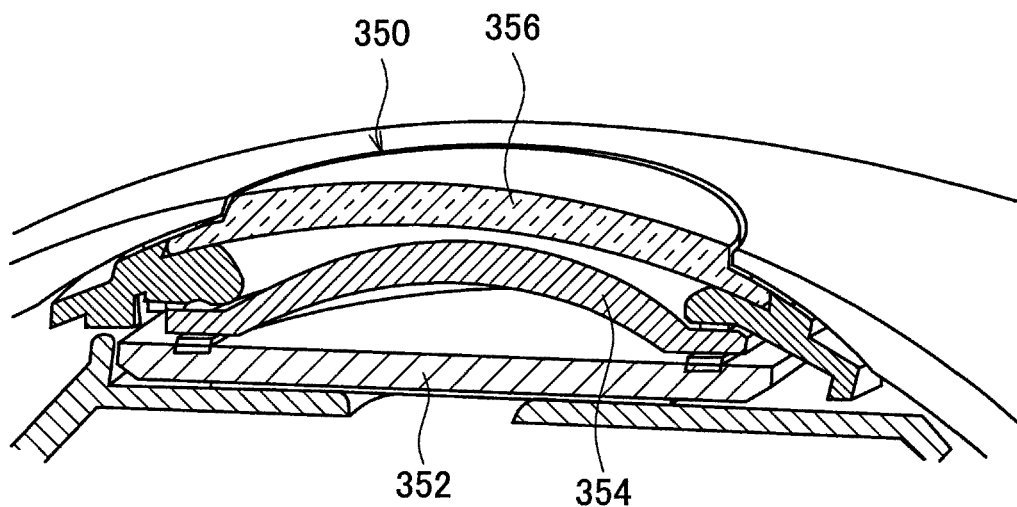
FIG. 10 is a schematic view illustrating a cross section taken along a one-dot chain line I-I' in FIG. 7.

Eyes 350 of the robot device 1000 illustrated in FIG. 7 are configured to perform various movements and displays in accordance with an operation of the robot device 1000. Therefore, the robot device 1000 includes a self-luminous display device (OLED) 352 in each of the left and right eyes 350. FIG. 10 is a schematic view illustrating a cross section taken along a one-dot chain line I-I' in FIG. 7. As illustrated in FIG. 10, the eye 350 of the robot device 1000 includes the OLED 352, a lens 354, and a cover glass 356.

The OLED 352, the lens 354, and the cover glass 356 are provided in each of the left and right eyes 350. In a case where a flat display device is provided in common for the left and right eyes, both the eyes have a flat arrangement and cannot be configured in a three-dimensional manner. In the present embodiment, by providing the OLED 352 for each of the left and right eyes 350 individually, an orientation of the left and right eyes 350 can be optimally arranged, and the left and right eyes 350 can be configured in the three-dimensional manner.

The OLED 352 performs display related to the eye 350 such as a blink of the eye 350, a white of the eye, an iris, and a movement of the iris. The lens 354 enlarges the display of the OLED 352 and refracts light so that the display of the OLED 352 is expanded.

A front surface of the lens 354 is formed by a convex curved surface, and the display of the OLED 352 is reflected by the curved surface. This configuration realizes spherical expression of an eyeball. As illustrated in FIG. 10, the lens 354 has a thickness that is thicker at the center and thinner at the periphery. By changing the thickness of the lens 354 between the center and the periphery, a curvature is different between a front surface and a back surface of the lens 354, and a lens effect can be generated. Furthermore, in a case where a user looks at the eye 350, it is possible to make the user feel the expansion of the display as described above. In addition, although the lens effect is too strong when the lens 354 is arranged without a gap so that a front surface of the OLED 352 is covered, the lens effect can be made appropriate by providing a space between the lens 354 and the OLED 352.

Although the display by the OLED 352 is planar, the display is performed at a desired position on the sphere by converting coordinates on the curved surface of the lens 354. Therefore, it is also possible to perform a control of directing a position of the iris toward a user by controlling a pitch angle and a yaw angle on the lens 354.

The cover glass 356 includes a transparent resin material or the like having a uniform thickness. A surface of the cover glass 356 forms a curved surface that is continuous with an adjacent surface of the head portion of the robot device 1000. With this arrangement, even in a case where a user touches the eye 350 and its periphery, the user does not feel a step, and it is possible to prevent generation of a sense of discomfort.

7. Configuration of Cover (Lid)

Figure 11A:
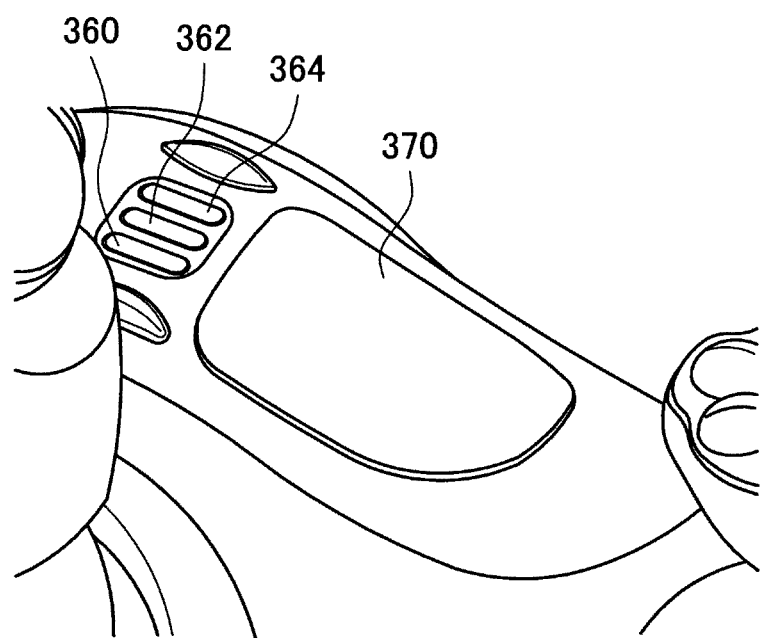
FIG. 11A is a schematic view illustrating a belly portion of the robot device.
Figure 11B:
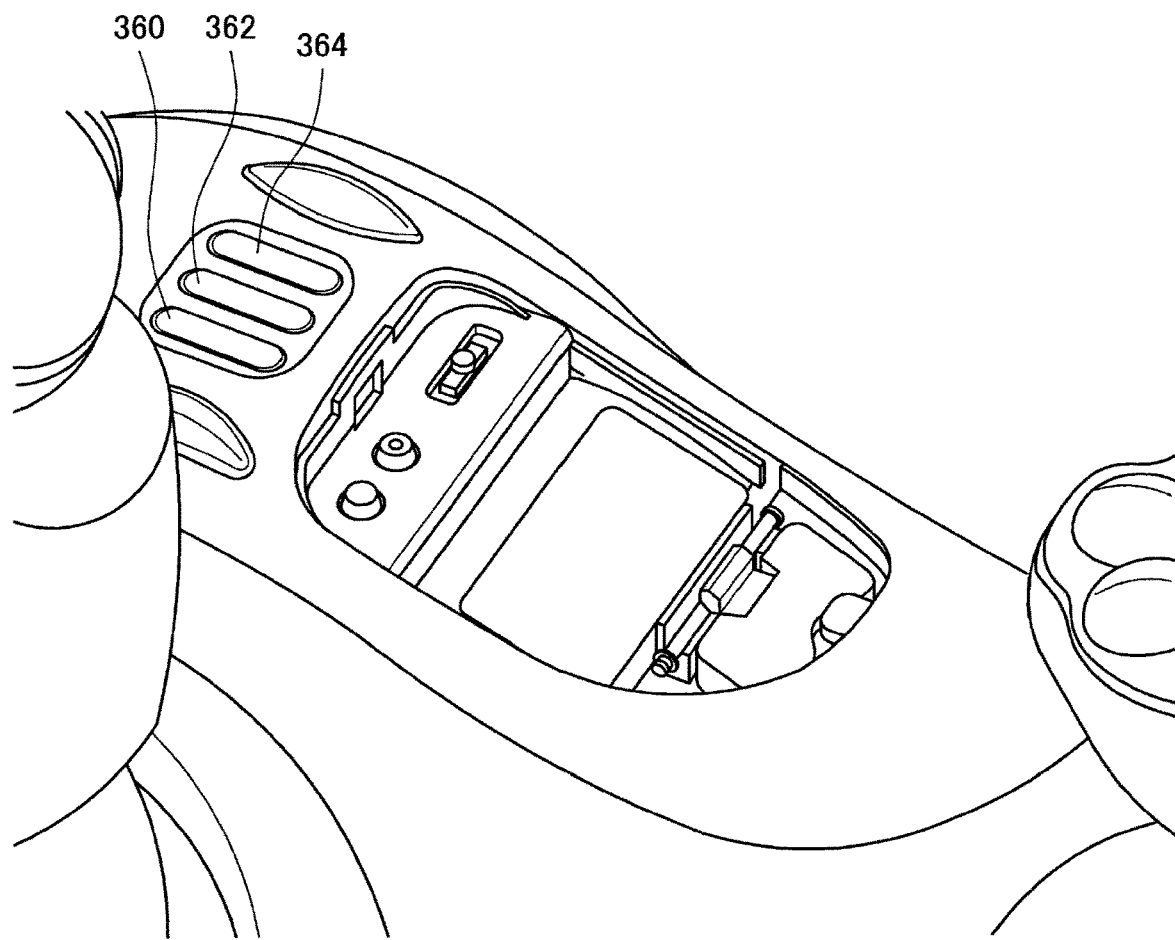
FIG. 11B is a schematic view illustrating a state in which a cover is detached from the state illustrated in FIG. 11A.

FIG. 11A is a schematic view illustrating a belly portion of the robot device 1000. Contact terminals 360, 362, and 364 for contacting a charging station and receiving power supply are provided on the belly of the robot device 1000. A battery 380 can be housed behind the contact terminals 360, 362, and 364, for example, and the battery 380 is exposed to the outside by detachment of a cover 370. Furthermore, a user can access various terminals and operation keys by detachment of the cover 370. FIG. 11B is a schematic view illustrating a state in which the cover 370 is detached from the state illustrated in FIG. 11A.

Figure 12A:
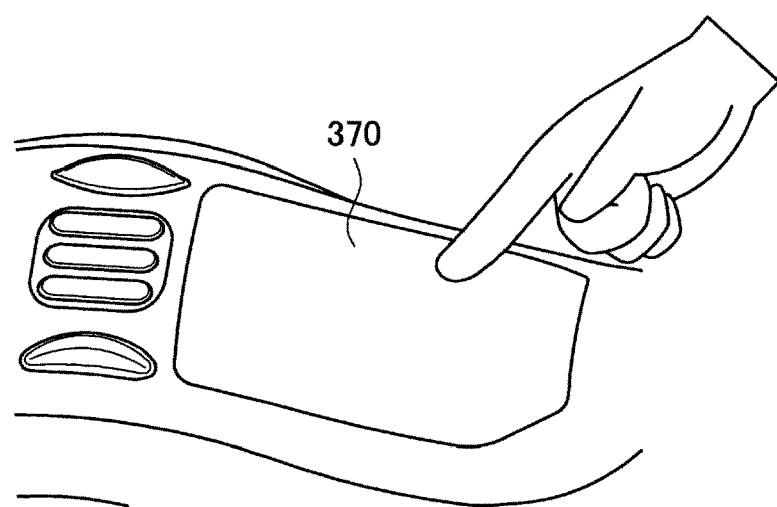
FIG. 12A is a schematic view illustrating how the cover is detached.
Figure 12B:
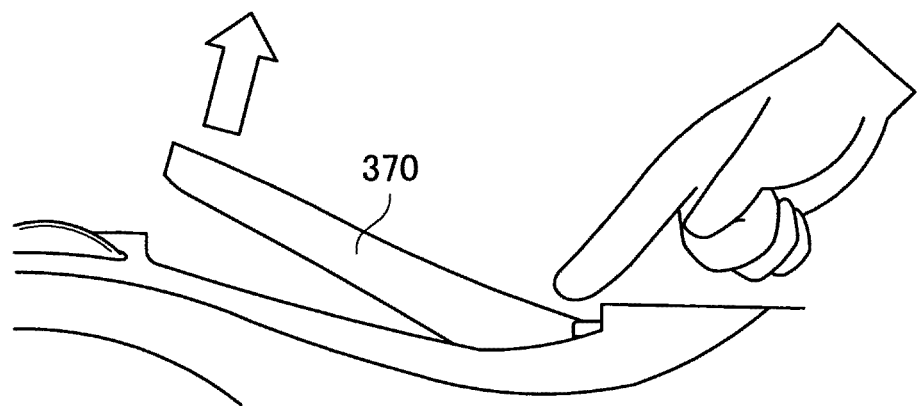
FIG. 12B is a schematic view illustrating how the cover is detached.
Figure 12C:
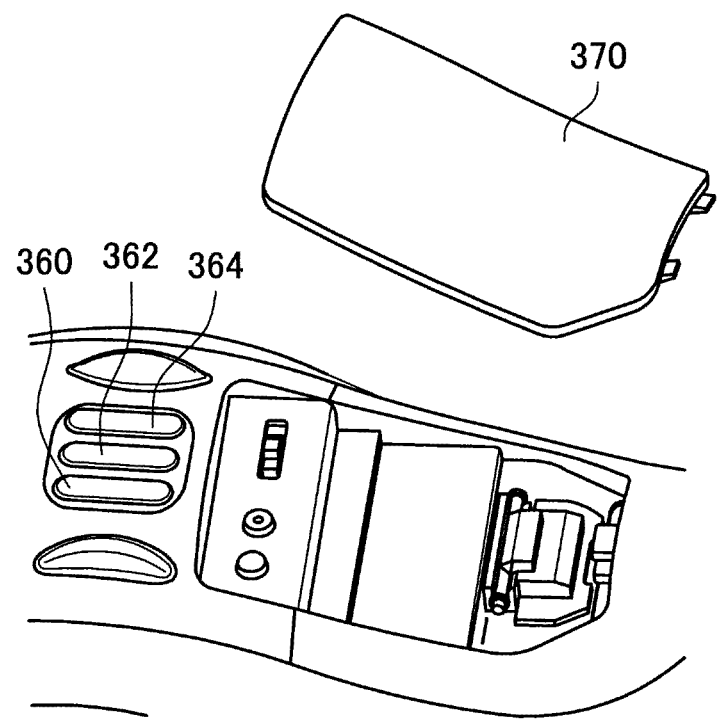
FIG. 12C is a schematic view illustrating how the cover is detached.

FIGS. 12A, 12B, and 12C are schematic views illustrating how the cover 370 is detached. Unlike a general electric product, the cover 370 is not provided with a structure for detaching the cover 370 by hooking a nail. When detaching the cover 370, first, an end of the cover 370 on a side of the rear leg is pushed with a finger as illustrated in FIG. 12A. As a result, as illustrated in FIG. 12B, a front end of the cover 370 is lifted. Accordingly, as illustrated in FIG. 12C, the cover 370 can be detached by pulling up the front end of the cover 370.

8. Configuration of Battery

Figure 13:
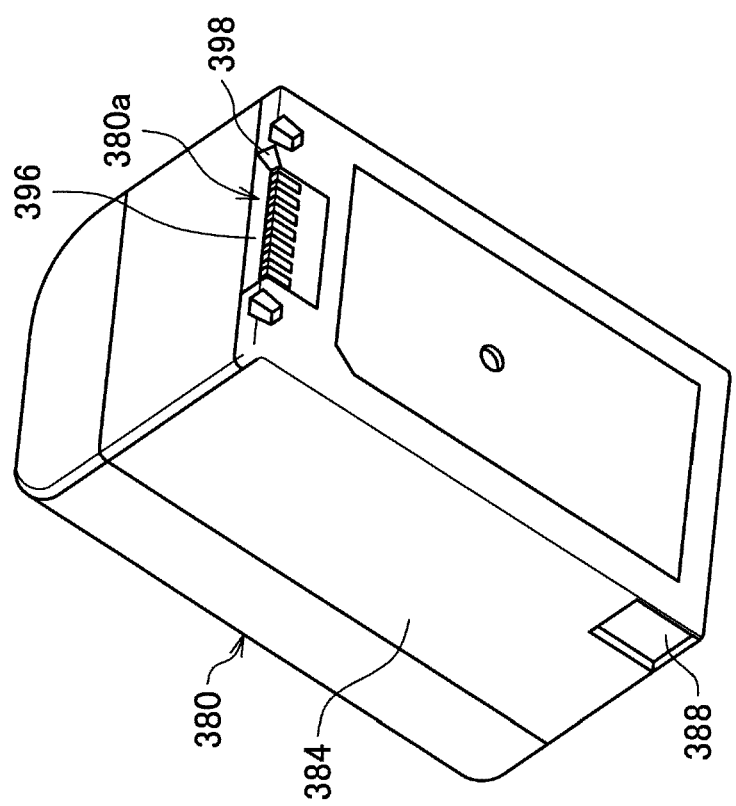
FIG. 13 is a schematic view illustrating a configuration of a battery.
Figure 13:
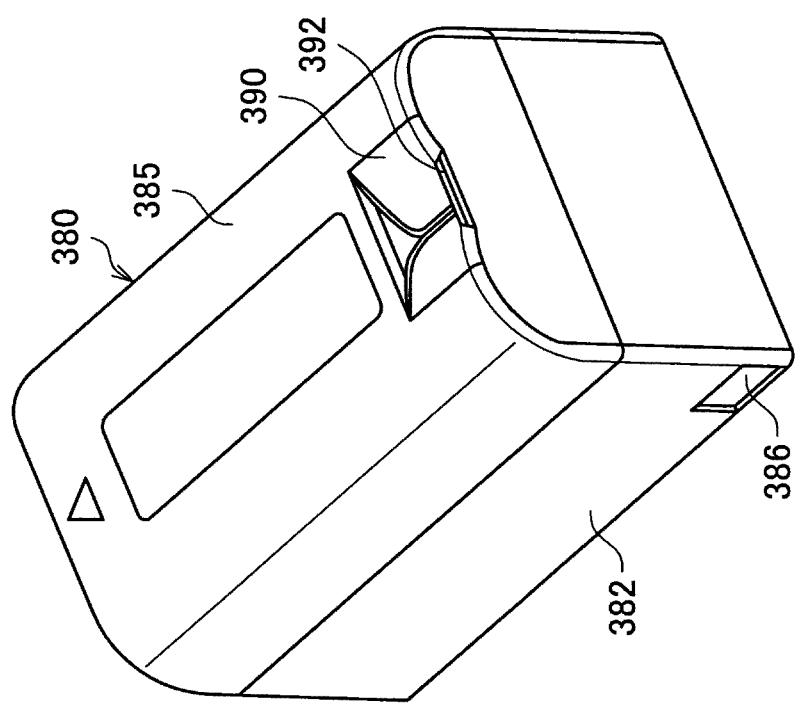

FIG. 13 is a schematic view illustrating a configuration of the battery 380. As illustrated in FIG. 13, the battery 380 has a substantially rectangular parallelepiped shape, and two of six sides of the rectangular parallelepiped are formed by curved surfaces. The battery 380 includes six terminals 380a that are electrically connected to the robot device 1000. By providing the six terminals 380a, it is possible to reliably supply electric power to the robot device 1000 that handles a large amount of electric power.

In addition, rectangular recesses 386 and 388 are provided on two opposing surfaces 382 and 384 of the battery 380. The recesses 386 and 388 are provided at opposing positions on the two surfaces 382 and 384. With this arrangement, the recesses 386 and 388 can be grasped with an index finger and a thumb, for example, and the battery 380 can be easily attached to and detached from the robot device 1000.

Furthermore, a standing wall 392 is provided on a surface 305 of the battery by forming a recess 390. With this arrangement, the battery 380 can be detached from the robot device 1000 by placing a finger on the standing wall 392.

An arrangement recessed portion 394 is formed at tips of the six terminals 380a. The arrangement recessed portion 394 is opened in a connection direction of the six terminals 380a and connection terminals on a side of the robot device 1000 connected to the terminals 380a. The arrangement recessed portion 394 is formed by arrangement recessed portion forming surfaces 396 and 398. At least a part of the arrangement recessed portion forming parts 396 and 398 is formed as an inclined surface so that an opening area of the arrangement recessed portion 394 increases as a distance from the terminals 380a increases, in a direction in which the arrangement recessed portion 394 opens. Note that a casing of the battery 380 is configured, for example, by combining an upper case and a lower case in upper and lower directions. In a housing space of the casing, a plurality of cells, a separator for separating and arranging the cells, a connection sheet metal connected to the cells, a circuit substrate, and the like are arranged. A basic configuration of the battery 380 can be configured similarly to a battery described in Japanese Patent No. 6191795, for example.

9. Configuration of Frame, Substrate, and Routing of Wiring

Figure 14:
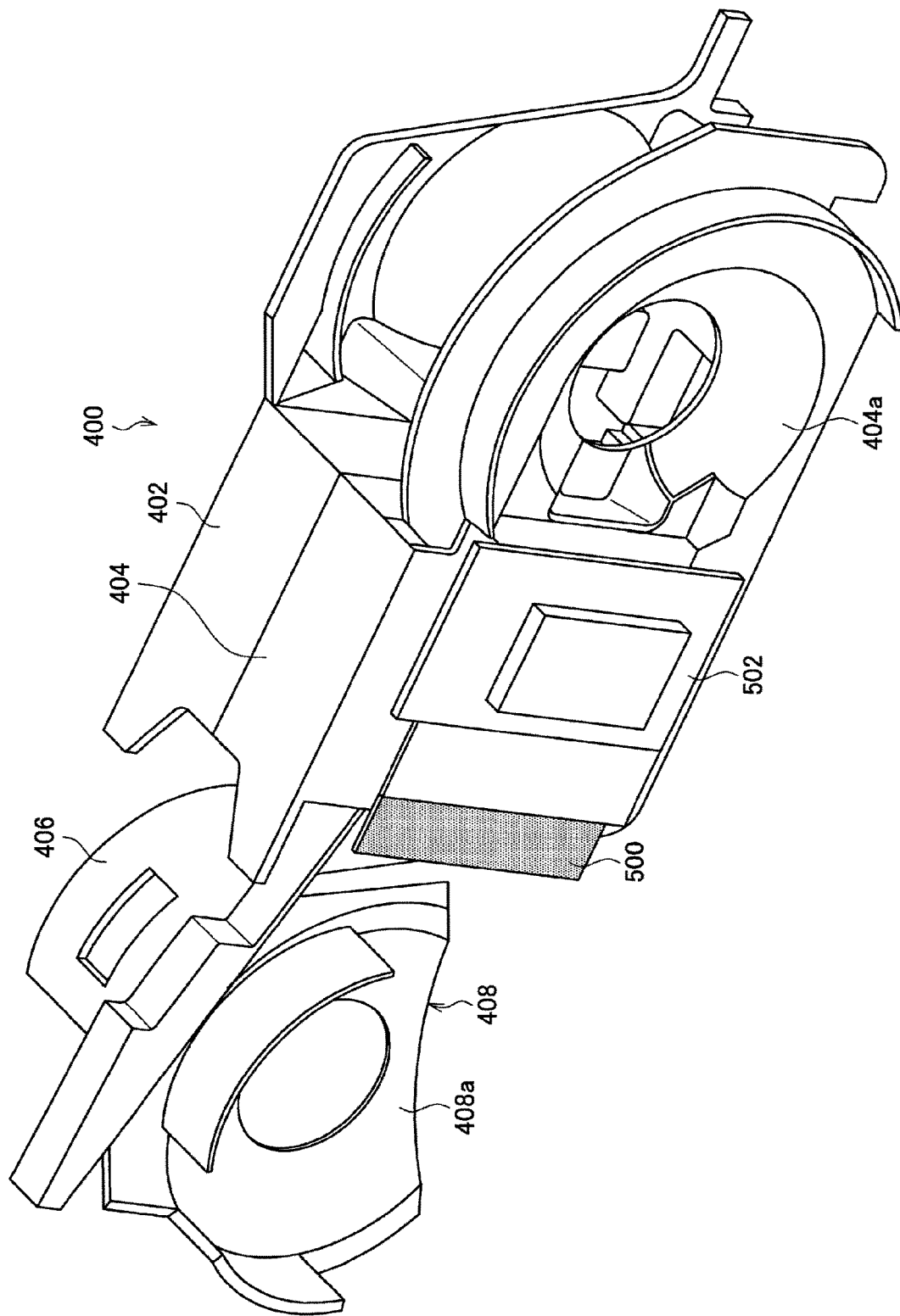
FIG. 14 is a schematic view illustrating a frame of the robot device and an arrangement of substrates.
Figure 15:
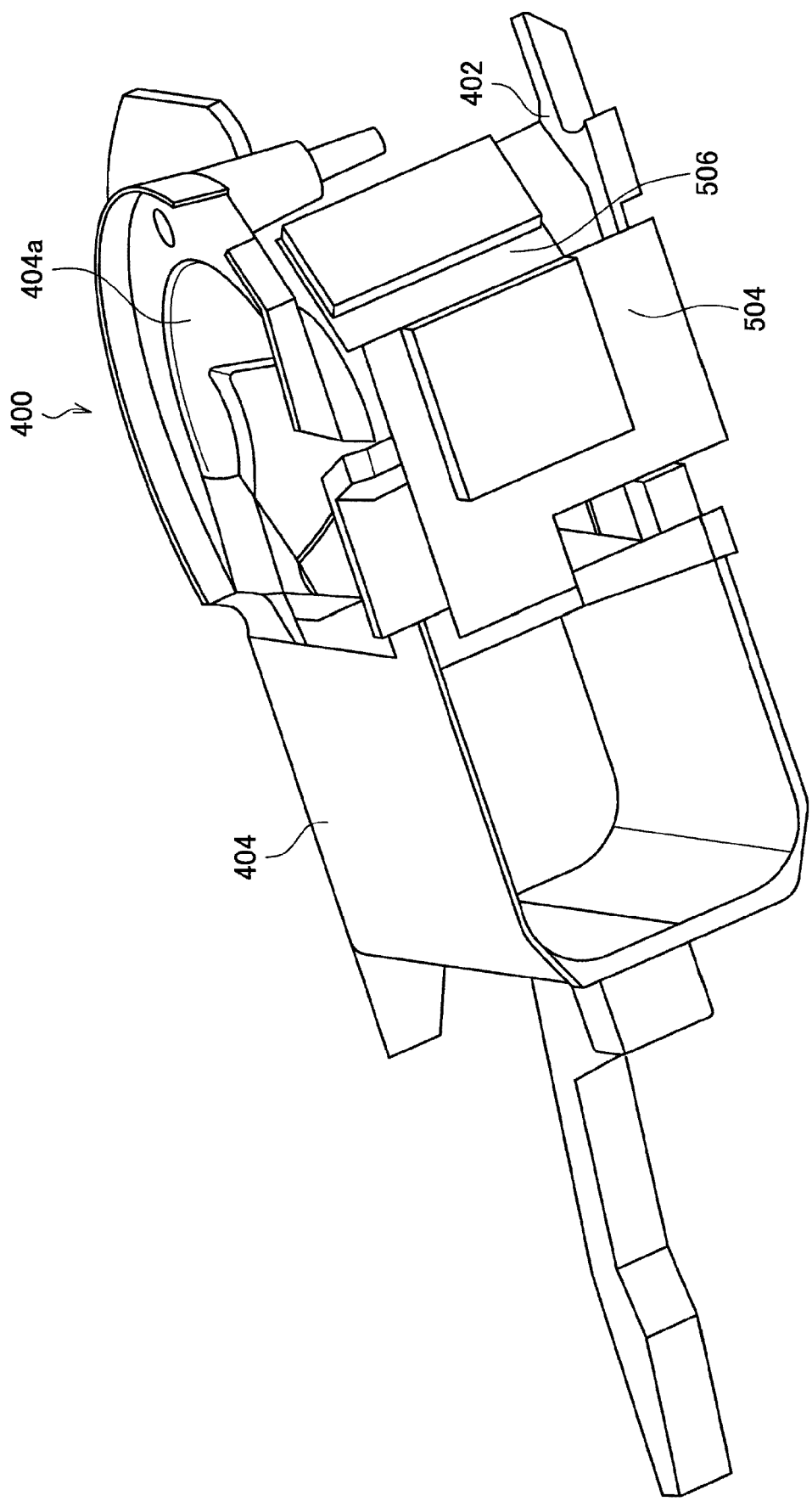
FIG. 15 is a schematic view illustrating the frame of the robot device and the arrangement of the substrates.
Figure 16:
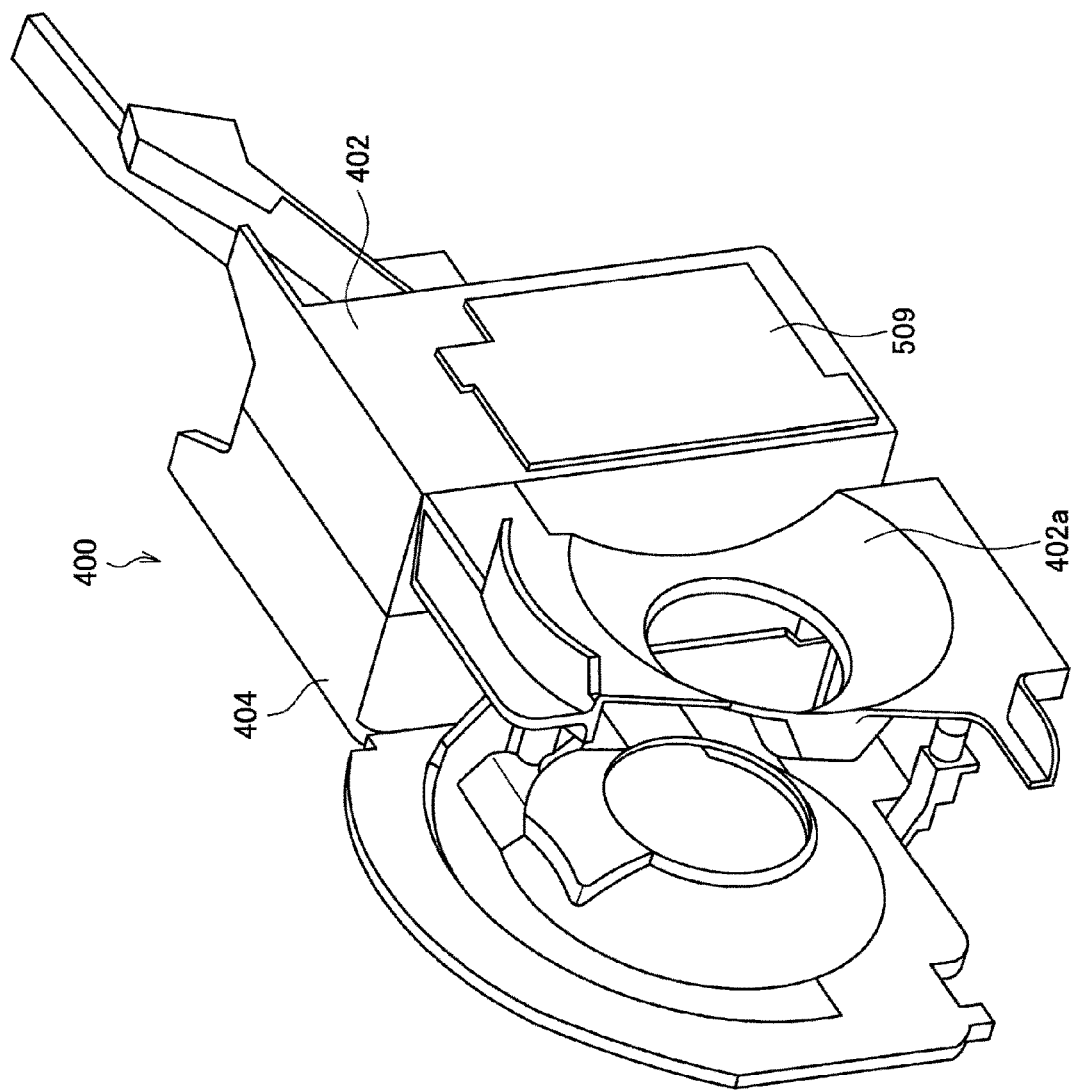
FIG. 16 is a schematic view illustrating the frame of the robot device and the arrangement of the substrates.

FIGS. 14 to 16 are schematic views illustrating the frame 400 of the robot device 1000 and an arrangement of a substrate 500. As an example, the frame 400 includes magnesium die-casting, and includes four components 402, 404, 406 and 408. FIGS. 14 to 16 illustrate the same frame 400 viewed from different directions, and the components 406 and 408 are not illustrated in FIGS. 15 and 16.

Recessed regions 402a and 404a are formed in the components 402 and 404, respectively, and the joint portions 112 and 114 of the left front leg and the joint portions 102 and 104 of the right front leg are coupled to the regions 402a and 404a, respectively. In addition, a recessed portion 408a is arranged also in the component 408, and the joint portions 122 and 124 of the right rear leg 120 are coupled to the recessed portion 408a. Similarly to the component 408, the component 406 is also provided with a recessed portion to which the joint portions 132 and 134 of the left rear leg 130 are coupled. The frames 406 and 408 rotate with respect to the frames 402 and 404 around the rotating shaft extending in a vertical direction by a driving force of a motor of the joint portion 142. With this arrangement, as described above, a movement of swinging the waist left and right in a case where the robot device 1000 is viewed from above is achieved.

It is possible to further increase rigidity of the robot device 1000 by configuring the frame 400 with magnesium die-casting, as compared to a case where the frame 400 is configured with a sheet metal.

As illustrated in FIGS. 14 to 16, circuit substrates 500, 502, 504, 506, 508, and 509 are arranged on the frame 400. A heat dissipation effect can be improved by dispersively arranging the circuit substrates 500, 502, 504, 506, 508, and 509 with respect to the frame 400.

Furthermore, usually, the frame of the robot device 1000 includes a box-shaped casing in many cases, but in the present embodiment, the frame includes magnesium die-casting components 402, 404, 406, and 408 instead of the box-shaped casing. Therefore, a degree of freedom in arrangement of the circuit substrates 500, 502, 504, 506, 508, and 509 can be greatly increased.

Figure 18:
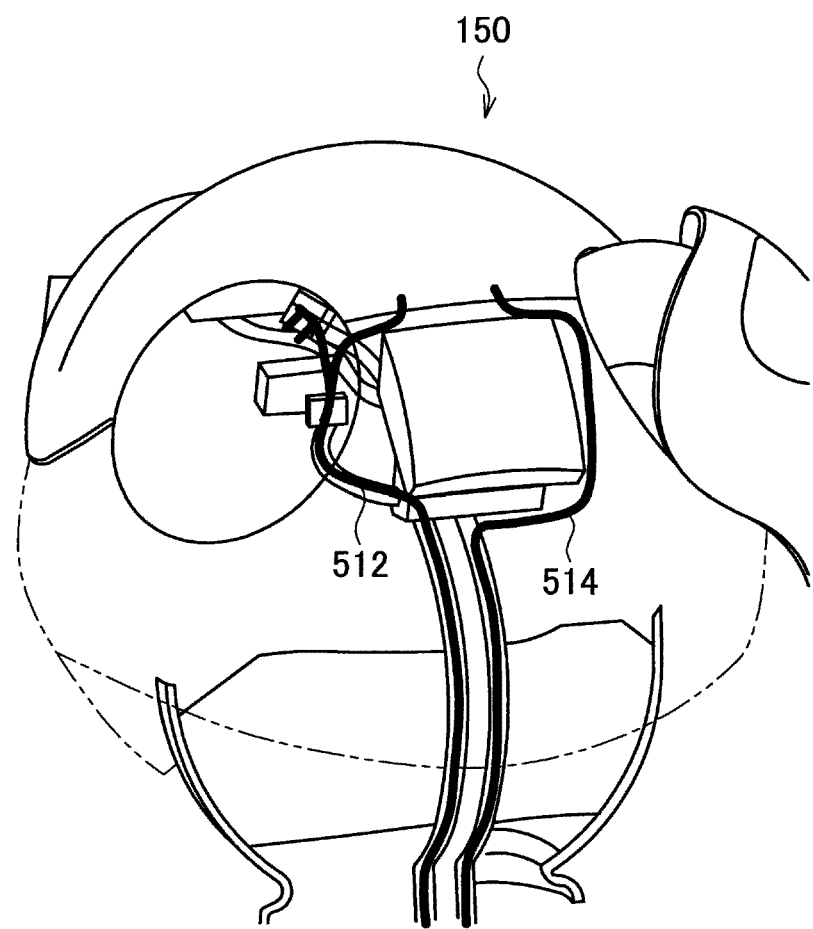
FIG. 18 is a schematic view illustrating a routing of the circuit substrate from the trunk to the head portion of the robot device.

Furthermore, FIGS. 17 and 18 are schematic views illustrating a routing of a circuit substrate 510 from the trunk to the head portion of the robot device 1000. As illustrated in FIG. 17, the circuit substrate 510 that connects the trunk 140 and the head portion 150 of the robot device 1000 is provided along an arm 170 that couples the joint portion 156 and the joint portion 158. The circuit substrate 510 desirably includes a flexible substrate (FPC) because the head portion 150 moves with respect to the trunk 140. As illustrated in FIG. 18, the circuit substrate 510 is separated into two circuit substrates 512 and 514, and the circuit substrates 512 and 514 are connected to another circuit substrate provided on the head portion 150.

A main circuit substrate of the robot device 1000 is provided on a side of the trunk. On the other hand, since various sensors, the display device of the eye, and the like are concentrated on the head portion 150, the circuit substrate 510 having a relatively large number of wires is used.

10. Configuration for Hiding Screw

Figure 19:
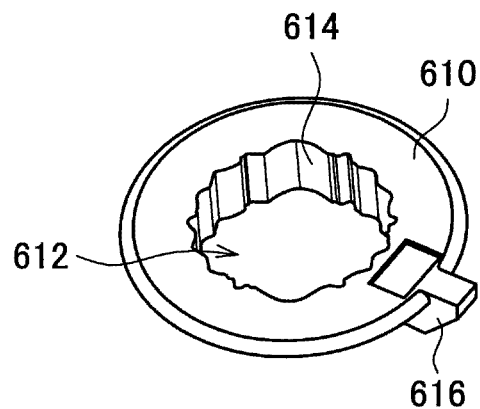
FIG. 19 is a schematic view illustrating a screw and a cover for hiding the screw.
Figure 19:
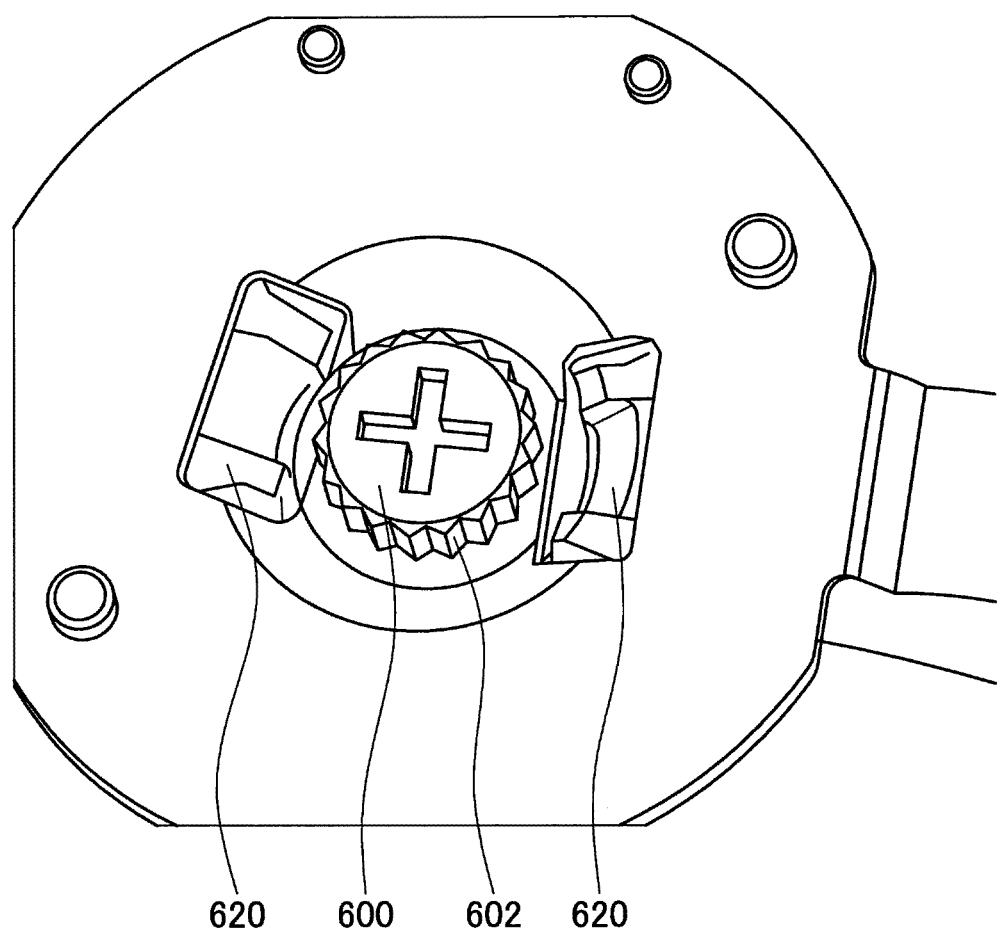

Screws are used at the time of assembling the robot device 1000, but all the screws are hidden so as not to be exposed to the appearance. For this reason, all the screws are arranged inside a cover of an exterior. FIG. 19 is a schematic view illustrating a screw 600 and a cover 610 that covers the screw 600. The screw 600 and the cover 610 appear when any cover of the exterior is detached. The cover 610 illustrated in FIG. 19 has functions of hiding the screw 600 and preventing the screw 600 from loosening.

As illustrated in FIG. 19, an uneven portion 602 is formed on a side surface of a head of the screw 600. The cover 610 is provided with a hole 612 into which the head of the screw 600 is inserted, and an uneven portion 614 corresponding to the uneven portion 602 on an outer periphery of the head of the screw 600 is provided on an inner periphery of the hole 612.

In addition, a recessed portion 620 is formed on the exterior around the screw 600. The cover 610 is provided with a protruding portion 616 corresponding to the recessed portion 620. With this arrangement, when the cover 610 is put on the screw 600, the uneven portion 614 of the cover 610 fits into the uneven portion 602 at the head of the screw 600, and the protruding portion 616 of the cover 610 fits into the recessed portion 620 of the exterior. As a result, the screw 600 can be prevented from loosening.

A preferred embodiment of the present disclosure has been described in detail above with reference to the accompanying drawings, but the technical scope of the present disclosure is not limited to such an example. It is obvious that a person having ordinary knowledge in the technical field of the present disclosure can come up with various changes or modifications within the scope of the technical idea described in the claims. Of course, it is understood that these changes or modifications also belong to the technical scope of the present disclosure.

Furthermore, the effects described in the present specification are merely illustrative or exemplary and are not limited. That is, the technology according to the present disclosure can exhibit other effects that are apparent to those skilled in the art from the description of the present specification, in addition to or instead of the above effects.

Note that the following configurations also belong to the technical scope of the present disclosure.

(1) A robot device including:
a head portion coupled to a trunk;
four leg portions on a front left, a front right, a rear left, and a rear right coupled to the trunk;
a first indirect portion that tilts the head portion left and right; and
a second joint portion that rotates, with respect to the trunk, one of the leg portions on the rear left and the rear right to a front side, and the other to a rear side.

(2) The robot device according to (1), in which a coupling portion between the trunk and one of the leg portions is provided with two rotating shafts that rotate the leg portion in a front-rear direction and a left-right direction, and the two rotating shafts are housed in one box.

(3) The robot device according to (2), in which an exterior of the leg portion is provided with grooves that avoid, when one of the two rotating shafts is driven, the rotating shaft from interfering with the other of the two rotating shafts, and
the robot device further includes covers that cover the grooves.

(4) The robot device according to any one of (1) to (3), in which each of the leg portions includes a plurality of rotating shafts, and two of the rotating shafts provided in a coupling portion between the trunk and the leg portion and one of the rotating shafts located immediately below the coupling portion are provided in one arm constituting the leg portion.

(5) The robot device according to any one of (1) to (4), in which each of the leg portions includes a plurality of joint portions, any one of the joint portions is connected with another one of the joint portions via a link, and the another one of the joint portions moves in conjunction with the any one of the joint portions by receiving a driving force of the any one of the joint portions.

(6) The robot device according to (5), in which the any one of the joint portions is a joint portion corresponding to a knee, and the another one of the joint portions is an indirect portion corresponding to an ankle.

(7) The robot device according to any one of (1) to (6), further including ears provided on the head portion, in which
a tip of each of the ears rotates in a front-rear direction.

(8) The robot device according to (7), in which the tip of each of the ears opens left and right while rotating forward and backward.

(9) The robot device according to (8), in which an angle at which each of the ears opens is increased as each of the ears rotates forward.

(10) The robot device according to any one of (1) to (9), further including a tail rotationally driven with respect to the trunk.

(11) The robot device according to (10), in which the tail includes silicone rubber, and is thicker from a base on a side closer to the trunk toward a tip.

(12) The robot device according to any one of (1) to (11), further including a sensor that detects a user touching the trunk or the head portion.

(13) The robot device according to (12), in which the sensor is configured by a combination of a pressure-sensitive sensor and an electrostatic sensor.

(14) The robot device according to any one of (1) to (13), further including eyes on the head portion, in which
each of the eyes includes a display device and a lens arranged on an outer side than the display device, and
the display device is provided individually for each of both the eyes.

(15) The robot device according to (14), in which the lens has different thicknesses at a position corresponding to a center of the display device and a position corresponding to a periphery of the display device.

(16) The robot device according to any one of (1) to (15), further including a charging terminal electrically connected to a charging station.

(17) The robot device according to any one of (1) to (16), further including a detachable battery.

(18) The robot device according to (17), in which the battery includes a first surface and a second surface opposite to the first surface, and
rectangular recesses are formed at corresponding positions on the first surface and the second surface.

(19) The robot device according to (17) or (18), in which the battery has a recess formed adjacent to a ridgeline where two surfaces are connected, and a standing wall is formed on the ridgeline by the recess.

(20) The robot device according to any one of (17) to (19), further including:
a housing portion that houses the battery; and
a lid that closes the housing portion, in which
when an end of the lid is pushed, an opposite side of the end is lifted and the lid becomes detachable.

(22) The robot device according to any one of (1) to (21), further including a magnesium die-casting frame constituting the trunk.

(23) The robot device according to (22), in which the frame includes a plurality of components divided in a left-right direction.

(24) The robot device according to (22) or (23), in which a plurality of circuit substrates is arranged on the frame.

(25) The robot device according to any one of (1) to (25), further including an arm that couples the trunk and the head portion, in which
wiring is provided along the arm.

REFERENCE SIGNS LIST

100, 110, 120, 130 Leg
102, 104, 106, 112, 114, 116, 122, 124, 126, 132, 134, 136, 142, 152, 154, 156, 158 Indirect portion
140 Trunk
150 Head portion
1000 Robot device

The invention claimed is:

1. A robot device comprising:
a head portion coupled to a trunk;
four leg portions on a front left, a front right, a rear left, and a rear right coupled to the trunk; and
a first joint portion that tilts the head portion in a front-rear direction, wherein
each of the leg portions include a first arm coupled to the trunk, a second joint portion coupled to the first arm, a second arm coupled to the second joint portion, a third joint portion coupled to the second arm, an arm tip portion coupled to the third joint portion, and a link coupled to the second arm and the arm tip portion, the second arm being coupled between the first arm and the arm tip portion, and
the arm tip portion rotates to a front side with respect to the trunk based on a rotation of the second joint portion in a first direction which rotates the second arm and the link to a rear side with respect to the trunk such that the rotation of the link rotates the third joint portion which rotates the arm tip portion to the front side with respect to the trunk.

2. The robot device according to claim 1, wherein a coupling portion between the trunk and each of the leg portions is provided with two rotating shafts that rotate a corresponding leg portion in the front-rear direction and a left-right direction, and the two rotating shafts are housed in one box.

3. The robot device according to claim 2, wherein an exterior of each of the leg portions is provided with grooves that avoid, when one of the two rotating shafts is driven, the one rotating shaft from interfering with another of the two rotating shafts, and
the robot device further comprises covers that cover the grooves.

4. The robot device according to claim 2, wherein the coupling portion between the trunk and each of the leg portions is provided with another rotating shaft different than the two rotating shafts and housed in another box different than the one box.

5. The robot device according to claim 1, wherein each of the leg portions includes a plurality of rotating shafts, and two rotating shafts of the plurality of rotating shafts provided in a coupling portion between the trunk and a corresponding leg portion and one rotating shaft of the plurality of rotating shafts located immediately below the coupling portion are provided in the first arm.

6. The robot device according to claim 1, wherein each of the leg portions includes a plurality of joint portions, one joint portion of the plurality of joint portions is connected with another joint portion of the plurality of joint portions via a link, and the another joint portion moves in conjunction with the one joint portion by receiving a driving force of the one joint portion.

7. The robot device according to claim 6, wherein the one joint portion is a joint portion corresponding to a knee, and the another joint portion is an indirect portion corresponding to an ankle.

8. The robot device according to claim 1, further comprising ears provided on the head portion, wherein
a tip of each of the ears rotates in the front-rear direction.

9. The robot device according to claim 8, wherein the tip of each of the ears opens in a left-right direction while rotating in the front-rear direction.

10. The robot device according to claim 1, further comprising a tail rotationally driven with respect to the trunk.

11. The robot device according to claim 1, further comprising a sensor that detects a user touching the trunk or the head portion.

12. The robot device according to claim 1, further comprising eyes on the head portion, wherein
each of the eyes includes a display device and a lens arranged on an outer side than the display device, and the display device is provided individually for each of both the eyes.

13. The robot device according to claim 12, wherein the lens has different thicknesses at a position corresponding to a center of the display device and a position corresponding to a periphery of the display device.

14. The robot device according to claim 1, further comprising a charging terminal electrically connected to a charging station.

15. The robot device according to claim 1, further comprising a detachable battery.

16. The robot device according to claim 15, wherein the battery includes a first surface and a second surface opposite to the first surface, and rectangular recesses are formed at corresponding positions on the first surface and the second surface.

17. The robot device according to claim 15, wherein the battery has a recess formed adjacent to a ridgeline where two surfaces are connected, and a standing wall is formed on the ridgeline by the recess.

18. The robot device according to claim 1, further comprising a magnesium die-casting frame constituting the trunk.

19. The robot device according to claim 18, wherein the frame includes a plurality of components equally divided in a left-right direction with respect to a centerline of the frame from the front side to the rear side of the frame.

20. The robot device according to claim 18, wherein a plurality of circuit substrates is arranged on the frame.

21. The robot device according to claim 1, further comprising an arm that couples the trunk and the head portion, wherein wiring is provided along the arm.

22. The robot device according to claim 1, wherein the arm tip portion rotates to the front side based on the rotation of the second arm to the rear side.

\* \* \* \* \*